(12) United States Patent
Fox et al.

(10) Patent No.: US 10,947,997 B2
(45) Date of Patent: Mar. 16, 2021

(54) AIRCRAFT HYDRAULIC SYSTEM WITH A DUAL SPOOL VALVE AND METHODS OF USE

(71) Applicant: The Boeing Company, Chicago, IL (US)

(72) Inventors: Michael Thomas Fox, Saint Charles, MO (US); Eric Anton Howell, Ballwin, MO (US); Jeffrey M. Roach, St. Charles, MO (US)

(73) Assignee: THE BOEING COMPANY, Chicago, IL (US)

( * ) Notice: Subject to any disclaimer, the term of this patent is extended or adjusted under 35 U.S.C. 154(b) by 530 days.

(21) Appl. No.: 15/952,641

(22) Filed: Apr. 13, 2018

(65) Prior Publication Data

US 2019/0316607 A1 Oct. 17, 2019

(51) Int. Cl.
*F15B 13/04* (2006.01)
*B64C 13/40* (2006.01)
(Continued)

(52) U.S. Cl.
CPC .......... *F15B 13/0402* (2013.01); *B64C 13/40* (2013.01); *F15B 11/08* (2013.01);
(Continued)

(58) Field of Classification Search
CPC ...... F15B 13/0402; F15B 15/14; F15B 11/08; F15B 2211/411; F15B 2013/041;
(Continued)

(56) References Cited

U.S. PATENT DOCUMENTS 2,660,028 A 11/1953 Geyer
2,679,827 A 6/1954 Perdue
(Continued)

FOREIGN PATENT DOCUMENTS

DE 102007029358 A1 1/2009
EP 1500825 A2 1/2005
(Continued)

OTHER PUBLICATIONS

Freescale Semiconductor, Inc., "M68HC08 Microcontrollers, High Data Rate Wireless USB Optical Mouse Solution Using the MC68HC908QY4 and MC68HC908JB12," Designer Reference Manual, DRM055/D, Jan. 1, 2004, Motorola, pp. 1-44.
(Continued)

*Primary Examiner* — Valentina Xavier
(74) *Attorney, Agent, or Firm* — Coats & Bennett, PLLC

(57) ABSTRACT

A dual spool valve and methods of controlling hydraulic fluid that is moved to a hydraulic actuator of an aircraft. The dual spool valve may include ports to receive and discharge hydraulic fluid. The dual spool valve may also include first and second valve sections that are selectively positionable to control the flow of hydraulic fluid into and out of the actuator. One position provides for hydraulic fluid to move through closure lines. Method of controlling the dual spool valve may provide for selectively positioning the valve sections to control the flow of hydraulic fluid, and to position the valve sections to move hydraulic fluid through a closure line during certain circumstances.

32 Claims, 25 Drawing Sheets

(51) Int. Cl.
  *F15B 11/08* (2006.01)
  *F15B 19/00* (2006.01)
(52) U.S. Cl.
  CPC .... *F15B 19/005* (2013.01); *F15B 2013/0412* (2013.01); *F15B 2211/40576* (2013.01)
(58) Field of Classification Search
  CPC .... F15B 20/008; F15B 15/04; F15B 13/0842; F15B 13/044; F15B 2211/8757; F15B 2211/7053; F15B 2211/6313; F15B 2211/327; F15B 2211/30565; F15B 2211/30525; F15B 19/00; F15B 13/0401; B64C 13/40
  See application file for complete search history.

(56) References Cited

U.S. PATENT DOCUMENTS

| | | | |
|---|---|---|---|
| 3,253,613 A | 5/1966 | Richolt | |
| 3,585,902 A * | 6/1971 | Anderson | F15B 18/00 91/363 A |
| 4,932,311 A | 6/1990 | Mibu et al. | |
| 5,074,495 A | 12/1991 | Raymond | |
| 5,144,851 A | 9/1992 | Grimm et al. | |
| 5,937,646 A | 8/1999 | Zakula | |
| 6,352,018 B1 | 3/2002 | Krisher | |
| 6,578,425 B2 * | 6/2003 | Hickman | B64C 13/40 73/716 |
| 7,059,563 B2 | 6/2006 | Huynh | |
| 8,109,163 B2 | 2/2012 | Hudson et al. | |
| 8,359,851 B2 | 1/2013 | Haase | |
| 8,418,956 B2 * | 4/2013 | Fukui | B64C 13/42 244/99.6 |
| 8,499,552 B2 | 8/2013 | Kauss et al. | |
| 9,334,914 B2 | 5/2016 | Gartner | |
| 9,618,102 B2 | 4/2017 | Hirai | |
| 9,709,052 B1 | 7/2017 | Tanju et al. | |
| 9,823,670 B2 | 11/2017 | Wilson et al. | |
| 9,969,233 B2 | 5/2018 | Leglize | |
| 9,994,304 B2 | 6/2018 | Ito | |
| 10,384,764 B2 | 8/2019 | Blanc et al. | |
| 2007/0194738 A1 | 8/2007 | Hirai | |
| 2015/0059325 A1 | 3/2015 | Knussman et al. | |
| 2015/0114151 A1 | 4/2015 | Hirai | |
| 2016/0091004 A1 | 3/2016 | Gomm et al. | |
| 2016/0096617 A1 | 4/2016 | Ito | |
| 2017/0233064 A1 | 8/2017 | McCormick et al. | |
| 2017/0335916 A1 | 11/2017 | Fox | |
| 2018/0128359 A1 | 5/2018 | Fida | |
| 2018/0135717 A1 | 5/2018 | Fox et al. | |
| 2018/0156293 A1 | 6/2018 | Fox et al. | |

FOREIGN PATENT DOCUMENTS

| | | |
|---|---|---|
| EP | 1710446 A2 | 10/2006 |
| EP | 3067252 A1 | 9/2016 |

OTHER PUBLICATIONS

Avago Technologies, "Optical Mouse Sensors," AV00-0115EN, May 14, 2007, pp. 1-24.
European Search Report dated Sep. 6, 2019 in re EP application No. 19169010.6 filed Apr. 12, 2019.
European Search Report dated Sep. 3, 2019 in re EP application No. 19167685.7 filed Apr. 5, 2019.

* cited by examiner

AIRCRAFT HYDRAULIC SYSTEM WITH A DUAL SPOOL VALVE AND METHODS OF USE

BACKGROUND

Aircraft include one or more movable flight control members such as ailerons on the wings for roll control, elevators on the horizontal tail of the empennage for pitch control, a rudder on the vertical tail of the empennage for yaw control, a nose cone of a missile, and other movable control surfaces. Movement of a flight control member is typically effected by one or more actuators mechanically coupled between a support member (e.g., a wing spar) and the flight control member. In many aircraft, the actuators for flight control members are linear hydraulic actuators driven by one or more hydraulic systems.

Hydraulic systems for aircraft are designed to provide hydraulic fluid to the hydraulic actuators to move and position the flight control members as necessary during the flight of the aircraft. The hydraulic systems can include a series of supply and return lines. One or more actuators are positioned along the supply and return lines and are attached to the flight control members. One or more pumps move the hydraulic fluid through the hydraulic system and supply it to the actuators. The hydraulic fluid is directed into different sections of the actuator to elongate and shorten the actuator and thus adjust the flight control member. The hydraulic fluid from the actuator is moved into the return line which returns the hydraulic fluid to the pump to be reused in the hydraulic system.

Valves are positioned near the actuators to control the movement of fluid into and out of the actuators. The valves should provide the flow of the hydraulic fluid to control the actuators during varying loads that are placed on the flight control members, and to meet rate demands for movement of the flight control members. The valves should be configured to provide the necessary hydraulic fluid to provide effective movement of the flight control members during a flight.

SUMMARY

One aspect is directed to a dual spool valve to direct hydraulic fluid to a hydraulic actuator in an aircraft. The valve includes a first port to receive hydraulic fluid from a first supply line, a second port to discharge hydraulic fluid to a return line, and a third port to receive hydraulic fluid from a second supply line. The valve also includes a first valve section with a first manifold with a supply port, a return port, and an actuator port. The first valve section also includes a first closure line that extends between the third port and the actuator. The first valve section also includes a first spool movable within the first manifold between a first position to allow hydraulic fluid to flow through the first valve section to and from the actuator through just the supply port, a second position to allow hydraulic fluid to flow through the first valve section to and from the actuator through just the return port, and a third position to allow hydraulic fluid to flow through the first valve section to and from the actuator through just the first closure line. The valve also includes a second valve section. The second valve section includes a second manifold with a supply port, a return port, and an actuator port. The second valve section also includes a second closure line that extends between the third port and the actuator. The second valve section also includes a second spool movable within the second manifold between a first position to allow hydraulic fluid to flow through the second valve section to and from the actuator through just the supply port, a second position to allow hydraulic fluid to flow through the second valve section to and from the actuator through just the return port, and a third position to allow hydraulic fluid to flow through the second valve section to and from the actuator through just the second closure line.

In one aspect, the first spool includes a shaft with first and second blocks spaced apart along the shaft with the shaft extending across the first closure line in each of the first and second positions.

In one aspect, the shaft includes an orifice that aligns with the first closure line in the third position to allow hydraulic fluid to flow along the first closure line and through the orifice to and from the actuator.

In one aspect, the orifice includes a smaller sectional area than the first closure line to control a flow of hydraulic fluid moving along the first closure line when the first valve section is in the third position.

In one aspect, the dual spool valve also includes a pair of first lines that extends between the first port and the supply ports of each of the first and second manifolds with the pair of first lines sharing a common section at the first port.

In one aspect, the dual spool valve also includes a pair of second lines that extends between the second port and the return ports of each of the first and second manifolds with the pair of second lines sharing a common section at the second port.

In one aspect, the first and second closure lines are isolated from the first and second pairs of lines.

One aspect is directed to an assembly to position a flight control member of an aircraft. The assembly includes a hydraulic actuator operatively connected to the flight control member and including a piston, a first chamber on a first side of the piston, and a second chamber on a second side of the piston. The assembly also includes a dual spool valve that includes a first valve section with a first manifold with a supply port, a return port, and an actuator port. The first valve section also includes a first closure line that extends to the first chamber of the actuator. The first valve section also includes a first spool movable within the first manifold between a first position to allow hydraulic fluid to flow through the first valve section to and from the first chamber of the actuator through just the supply port, a second position to allow hydraulic fluid to flow through the first valve section to and from the first chamber of the actuator through just the return port, and a third position to allow hydraulic fluid to flow through the first valve section to and from the first chamber of the actuator through just the first closure line. The dual spool valve also includes a second valve section. The second valve section includes a second manifold with a supply port, a return port, and an actuator port. The second valve section also includes a second closure line that extends to the second chamber of the actuator. The second valve section also includes a second spool movable within the second manifold between a first position to allow hydraulic fluid to flow through the second valve section to and from the second chamber of the actuator through just the supply port, a second position to allow hydraulic fluid to flow through the second valve section to and from the second chamber of the actuator through just the return port, and a third position to allow hydraulic fluid to flow through the second valve section to and from the second chamber of the actuator through just the second closure line.

In one aspect, the dual spool valve also includes a first port to receive hydraulic fluid, a second port to discharge hydraulic fluid, and a third port to receive hydraulic fluid.

In one aspect, the assembly also includes a first supply line fluidly connected to the first port and a second supply line fluidly connected to the third port, with the second supply line supplying hydraulic fluid to the dual spool valve at a lower pressure than the first supply line.

In one aspect, the assembly also includes a return line fluidly connected to the second port to receive hydraulic fluid that is removed from each of the first and second chambers of the actuator.

In one aspect, the first and second spools include a common shape and size.

In one aspect, the first spool includes a shaft with first and second blocks spaced apart along the shaft with the first block positioned at the supply port in the first position, the second block positioned at the return port in the second position, and the shaft extending across the first closure line in each of the first and second positions.

In one aspect, the shaft of the first spool includes an orifice that is aligned with the first closure line in the third position to allow hydraulic fluid to flow along the first closure line through the orifice to and from the first chamber of the actuator.

In one aspect, the orifice includes a smaller sectional area than the first closure line to control a flow of hydraulic fluid moving along the first closure line when the first valve section is in the third position.

In one aspect, the shaft of the second valve section includes an orifice that is aligned with the second closure line in the third position to allow hydraulic fluid to flow along the second closure line through the orifice and to and from the second chamber of the actuator.

In one aspect, the assembly also includes a pair of first lines that extends between the first port and the supply ports of each of the first and second manifolds with the pair of first lines sharing a common section at the first port.

In one aspect, the assembly also includes a pair of second lines that extends between the second port and the return ports of each of the first and second manifolds with the pair of second lines sharing a common section at the second port.

In one aspect, the first and second closure lines are isolated from the first and second pairs of lines.

One aspect is directed to a method of controlling an actuator connected to a flight control member of an aircraft. The method includes operating a dual spool valve in a first setting by selectively positioning a first spool and controlling hydraulic fluid moving through first and second ports into and out of a first chamber of the actuator and selectively positioning a second spool and controlling hydraulic fluid moving through the first and second ports into and out of a second chamber of the actuator. The method also includes operating the dual spool valve in a second setting by positioning the second spool to a fixed position and preventing hydraulic fluid from moving into or out of the second chamber through either the first or second ports and allowing hydraulic fluid into and out of the second chamber through a third port and selectively positioning the first spool and controlling hydraulic fluid moving through the first and second ports into and out of the first chamber.

In one aspect, the method also includes selectively positioning the first spool in a first manifold and selectively positioning the second spool in a second manifold.

In one aspect, the method also includes in the first setting blocking a second line extending from the third port with the first spool and preventing hydraulic fluid from moving into or out of the first chamber through the third port and blocking a first line extending from the third port with the second spool and preventing hydraulic fluid from moving into or out of the second chamber through the third port.

In one aspect, the method also includes in the second setting aligning an orifice in the second spool with the first line and allowing hydraulic fluid from the third port to move through the orifice and into the second chamber.

In one aspect, the method also includes in the second setting aligning an orifice in the first spool away from the second line and preventing hydraulic fluid from moving along the second line to the first chamber.

In one aspect, the method also includes the hydraulic fluid at the first port is at a higher pressure than the hydraulic fluid at the third port.

In one aspect, the method also includes determining a failure in the dual spool valve and changing the operation of the dual spool valve from the first setting to the second setting.

In one aspect, the method also includes determining that one of the first and second spools did not move to a commanded position and changing the operation of the dual spool valve from the first setting to the second setting.

In one aspect, the method also includes de-energizing a solenoid operatively connected to the second spool and positioning the second spool in a fixed position in the second setting.

In one aspect, the method also includes operating a first solenoid and selectively positioning the first spool and simultaneously operating a second solenoid and selectively positioning the second spool.

One aspect is directed to a method of controlling an actuator connected to a flight control member of an aircraft. The method includes operating a dual spool valve in a first setting by selectively positioning a first spool between first and second positions to block and open a supply port and a return port in the first manifold and controlling hydraulic fluid into and out of a first chamber of the actuator and simultaneously selectively positioning a second spool between first and second positions to block and open a supply port and a return port in the second manifold and controlling hydraulic fluid into and out of a second chamber of the actuator. The method also includes determining that the second spool has failed and moving the second spool to a failed position and blocking the supply port and the return port in the second manifold and opening a second supply port and moving hydraulic fluid into and out of the second chamber. The method also includes while the second spool is in the failed position, selectively positioning the first spool between the first and second positions to block and open the first supply port and the return port in the first manifold and controlling hydraulic fluid into and out of the first chamber of the actuator.

In one aspect, the method also includes aligning an orifice in the second spool with a supply line extending from the second supply port and moving hydraulic fluid to move into and out of the second chamber.

In one aspect, the method also includes in the first setting positioning the orifice in the second spool away from the supply line extending from the second supply port and blocking hydraulic fluid in the supply line.

DETAILED DESCRIPTION

Figure 1:
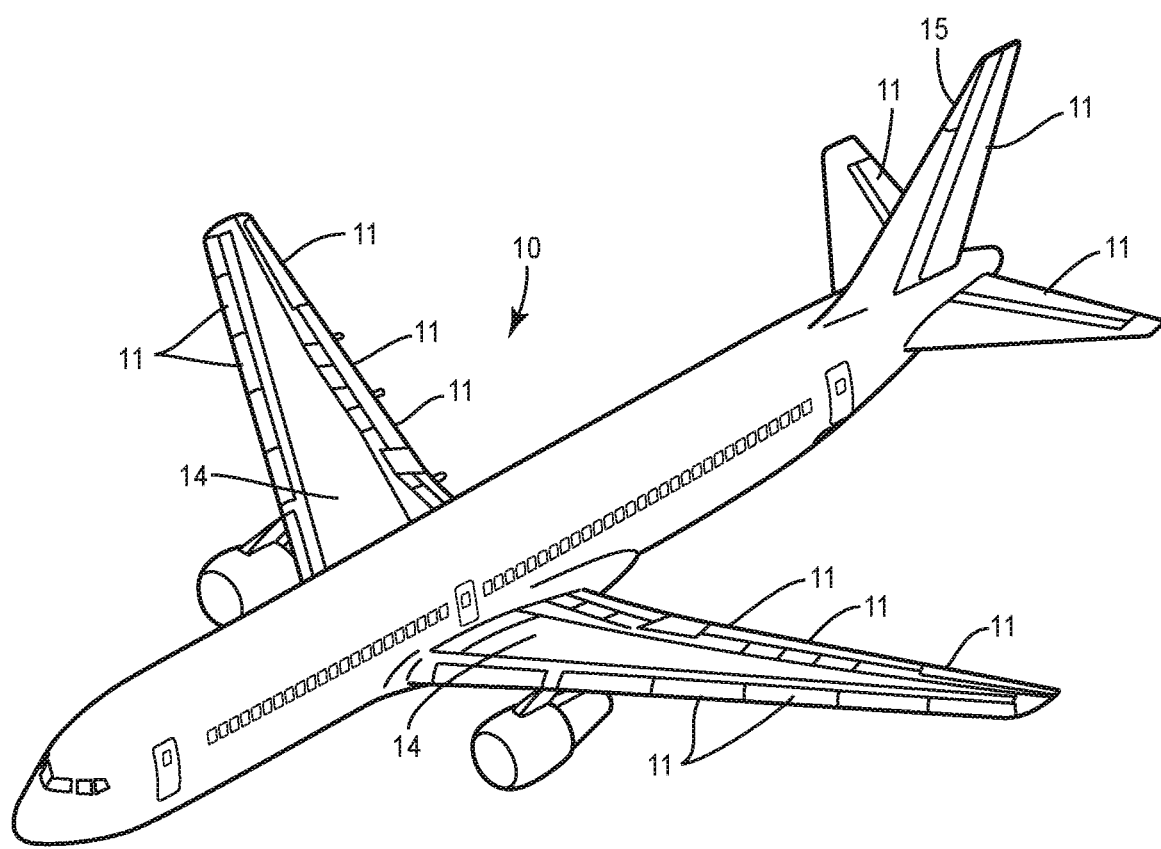
FIG. 1 is a perspective view of an aircraft.
Figure 2:
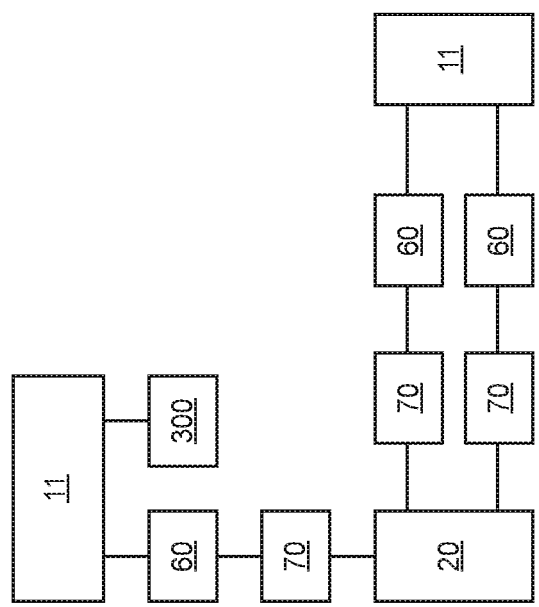
FIG. 2 is a schematic view of a hydraulic system and actuators that move flight control members.

An aircraft 10 can include one or more flight control members 11. As illustrated in FIG. 1, flight control members 11 can include but are not limited to a rudder, elevators, ailerons, wing leading and trailing edge devices, and spoilers. The flight control members 11 are movably attached to various sections of the aircraft 10 such as the wings 14 and tail 15 to change their orientation to control the flight. As illustrated in FIG. 2, one or more actuators 60 are connected to the flight control members 11 to control the orientation relative to the remainder of the aircraft 10. A hydraulic system 20 supplies hydraulic fluid to first and second chambers 61, 62 of the actuators 60 to adjust the orientation of the flight control members 11. Prior to reaching the actuators 60, the hydraulic fluid moves through a valve 70 that controls the flow into and out of the chambers 61, 62. Inerters 300 can also be positioned to extend between a support member and the flight control member 11 and work with the actuators 60 for damping of the flight control member.

Figure 3:
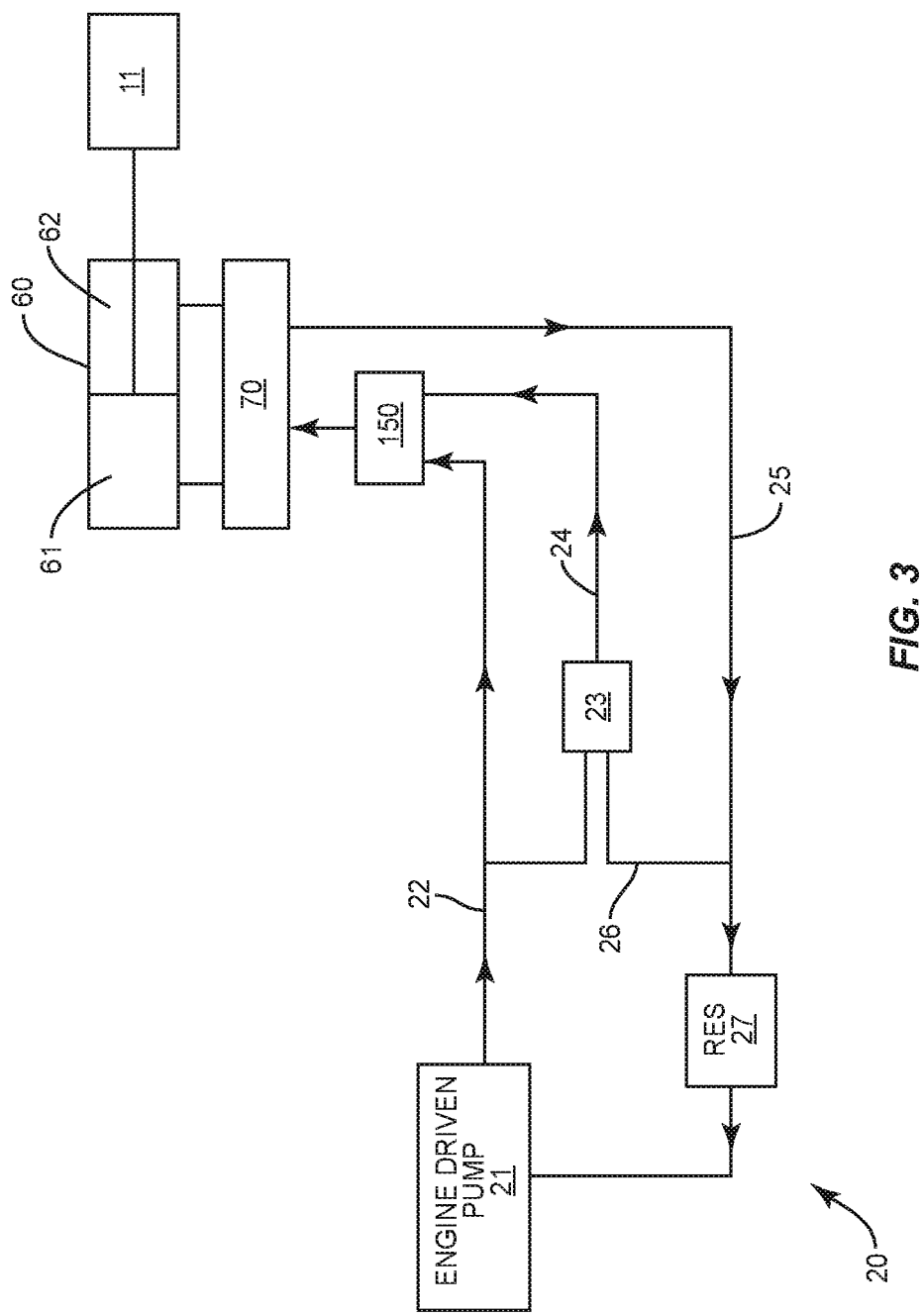
FIG. 3 is a schematic diagram of a hydraulic system that supplies hydraulic fluid to and from an actuator.

FIG. 3 illustrates an overview of a hydraulic system 20 that supplies hydraulic fluid to the actuators 60. Although FIG. 3 includes a single actuator 60, the hydraulic system 20 is capable of supplying hydraulic fluid to multiple actuators 60. The hydraulic system 20 includes an engine driven pump 21 that supplies the hydraulic fluid at a supply pressure through a supply line 22 to the actuators 60. The engine driven pump 21 can supply the hydraulic fluid at a variety of different pressures. One specific design includes a system pressure of 1200 psi.

A boost pump 23 can supply hydraulic fluid at an elevated pressure to the actuators 60. The boost pump 23 can be necessary to supply the hydraulic fluid when the hydraulic fluid supplied by the engine driven pump 21 falls below a predetermined pressure. The boost pump 23 is able to supply hydraulic fluid at a variety of pressures which can be variable during flight. One design includes supplying hydraulic fluid at a pressure of 3000 psi.

A boost line 24 extends between the boost pump 23 and the valve 70 to supply the boosted hydraulic fluid to the actuator 60. A manifold 150 (see also FIG. 9) can receive hydraulic fluid from both supply line 22 and boost line 24 and supply the hydraulic fluid to the valve 70. A return line 25 moves the hydraulic fluid from the actuators 60 and the valve 70. The return line 25 leads to a reservoir 27 where the hydraulic fluid can be stored and cooled before being re-supplied to the engine driven pump 21. A spare line 26 extends from the return line 25 and leads to the boost pump 23. In the event an inadequate amount of hydraulic fluid is available at the boost pump 23, returning hydraulic fluid can be supplied to the boost pump 23 before it is moved along the return line 25 to the reservoir 27.

The boost pump 23 is positioned along the hydraulic system 20 away from the engine driven pump 21. This distributed architecture can provide for more responsiveness as hydraulic fluid at an elevated pressure can be supplied to the actuators 60 in less time. The distributed architecture also allows for hydraulic fluid from the actuators 60 to bypass a portion of the return line 25 and be directed to the boost pump 23. This feature saves energy loss due to a pressure drop in the return line 25 that routes the hydraulic fluid back to the engine driven pump 21. The supply line 22 from the engine driven pump 21 can also be reduced in size to save weight since hydraulic fluid at higher pressures does not move this section of the hydraulic system 20.

Figure 4:
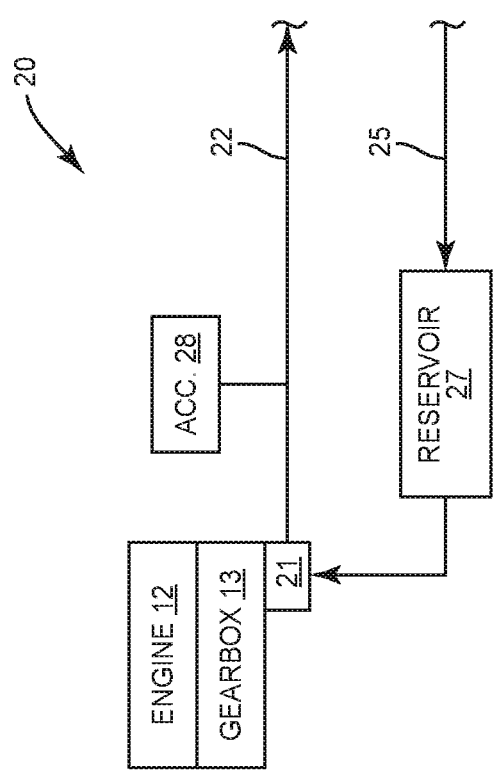
FIG. 4 is a partial schematic view of a portion of a hydraulic system.

FIG. 4 illustrates a section of a hydraulic circuit 20 that includes the engine driven pump 21 positioned at an engine 12 of the aircraft 10. Mechanical power generated by the engine 12 is converted into hydraulic or electrical power for distribution about the aircraft 10. A gearbox 13 can integrate or couple the engine 12 to the engine driven pump 21. The gearbox 13 can also integrate or couple the engine 12 to an electric generator and/or environmental control system (not illustrated). The engine driven pump 21 converts mechanical power provided by the engine 12 into hydraulic power for distribution about the hydraulic system 20.

An accumulator 28 can be connected to the supply line 22 downstream from the engine driven pump 21 to supply additional hydraulic fluid for use in the hydraulic system 20. The accumulator 28 can supply hydraulic fluid in certain circumstances, such as but not limited to when a volume of hydraulic fluid moving along the supply line 22 drops below a predetermined level or when a pressure of the hydraulic fluid in the supply line 22 is below a predetermined level.

The reservoir 27 is positioned along the return line 25 upstream from the engine driven pump 21. The reservoir 27 stores the hydraulic fluid at a working pressure and can also provide for cooling the hydraulic fluid prior to being re-introduced back to the engine driven pump 21.

The aircraft 10 can include multiple hydraulic systems 20 to control the movement of the flight control members 11.

This can include a first hydraulic system 20 that extends along a first portion of the aircraft (e.g., starboard side). The first hydraulic system 20 includes an engine driven pump 21 that is driven by a first engine (e.g., a starboard engine). A second hydraulic system 20 can be positioned on a second portion of the aircraft and include a separate engine driven pump 12 that is driven by a different engine. The number of hydraulic systems 20 in an aircraft 10 can vary. Further, the engines 12 can drive different numbers of engine driven pumps 21. For example, an aircraft 10 can include four main engines, namely two left main engines and two main right engines. Each main engine can drive two engine driven pumps 21. Additionally, the aircraft 10 can include two hydraulic systems 20, where four engine driven pumps 21 associated with the left main engines 12 produce hydraulic power to a left hydraulic system 20 and four engine driven pumps 21 associated with the right main engines 12 produce hydraulic power to a right hydraulic system 20.

Figure 5:
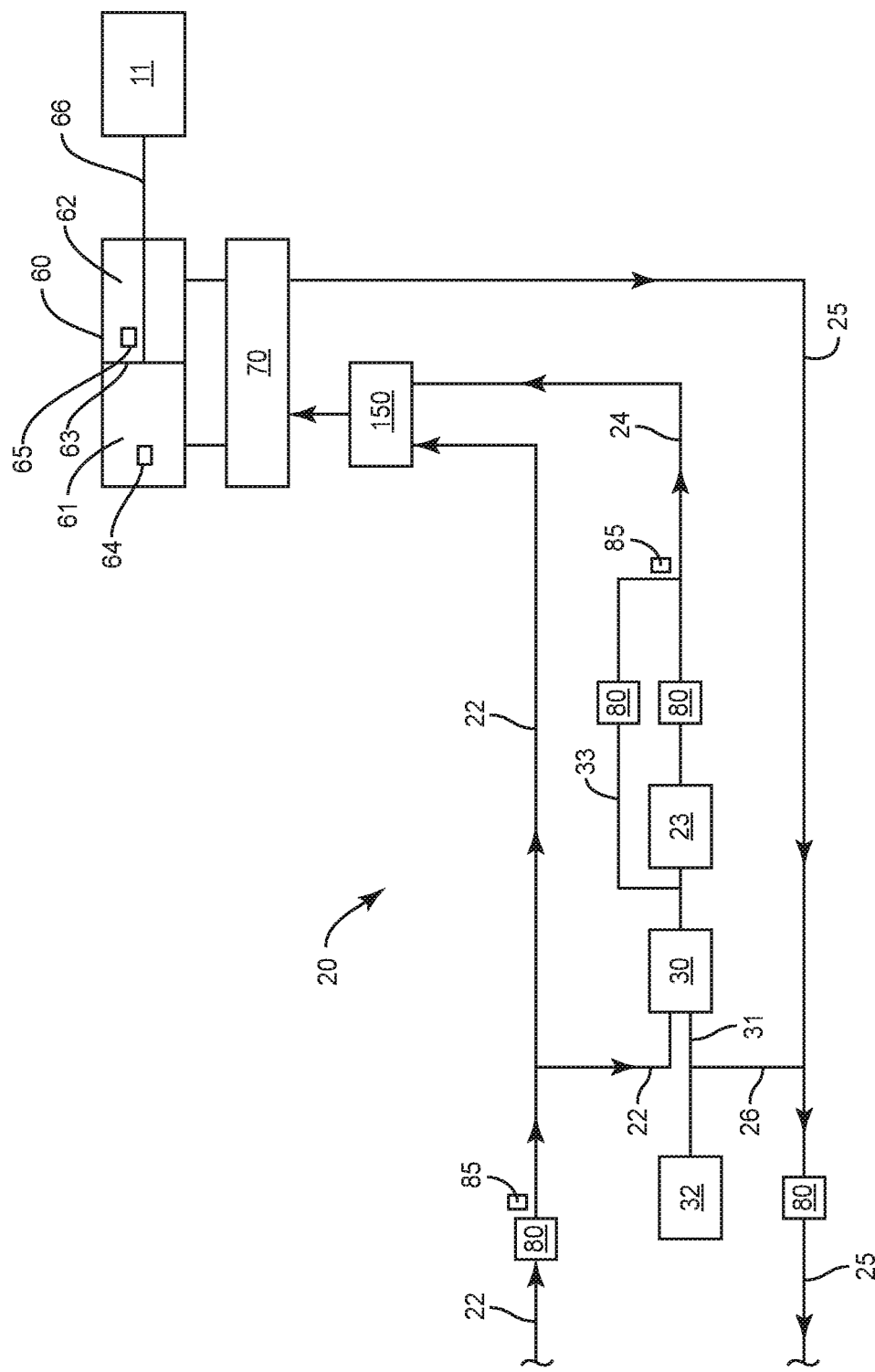
FIG. 5 is a partial schematic view of a portion of a hydraulic system and an actuator that receives hydraulic fluid from the hydraulic system.

FIG. 5 illustrates another section of the hydraulic system 20 that receives the hydraulic fluid along supply line 22 from the engine driven pump 21 and returns the hydraulic fluid back through the return line 25 to the reservoir 27. The supply line 22 leads to the valve 70 to supply hydraulic fluid at system pressure from the engine driven pump 21. The supply line 22 also branches and leads to the boost pump 23. One or more check valves 80 can be positioned along the supply line 22 to prevent movement of the hydraulic fluid in the reverse direction (i.e., towards the engine driven pump 21).

Figure 6:
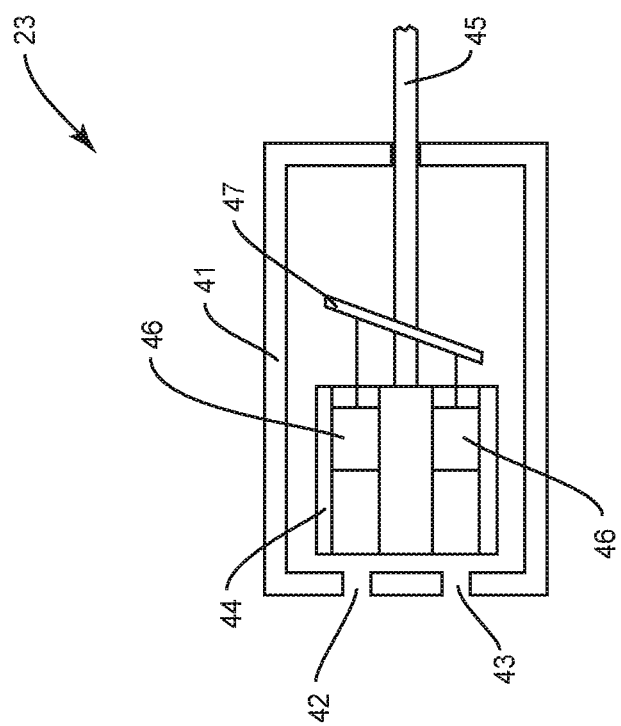
FIG. 6 is a schematic diagram of a hydraulic pump.

The boost pump 23 is configured to move hydraulic fluid at an elevated pressure through a boost line 24 to the valve 70. One type of hydraulic pump 21, 23 is an axial piston pump which can also be referred to as a swash-plate pump. FIG. 6 illustrates an axial piston pump 21, 23 that includes a housing 41 with an inlet 42 and an outlet 43. A block 44 is positioned within the housing 41 and rotates on a shaft 45. Pistons 46 are positioned within cylinders in the block 44 and contact against a stationary swashplate 47. The swashplate 47 is positioned at an angle relative to the block 44. The pistons 46 extend outward from the block 44 and contact against the swashplate 47 during rotation of the block 44. The pistons 46 remain in contact with the swashplate 47 during the rotation resulting in a reciprocating motion that drives the hydraulic fluid through the outlet 43. The pumps 21, 23 can also include other types of hydraulic pumps that can move pressurized fluid through the supply lines 22, 24.

A valve 30 is positioned upstream from the boost pump 23 to control the source of hydraulic fluid that is supplied to the boost pump 23. The valve 30 can be a shuttle valve that is positionable between first and second valve positions based on the pressure of the hydraulic fluid at the valve 30. In the first valve position, the valve 30 passes hydraulic fluid from just the supply line 22 to the boost pump 23. In the second valve position, the valve 30 passes hydraulic fluid from just the spare line 26 and an accumulator 32 to the boost pump 23. The valve 30 can be a shuttle valve that is sprung from the first valve position to the second valve position to assure an adequate amount of hydraulic fluid is supplied to the boost pump 23.

The accumulator 32 is positioned upstream from the boost pump 23 and holds hydraulic fluid that can be supplied to the boost pump when the valve 30 is in the second valve position. The accumulator 32 assures the spare line 26 provides adequate flow of hydraulic fluid when the valve 30 is in the second valve position. The close proximity of the accumulator 32 to the boost pump 23 provides for an efficient supply of hydraulic fluid as little pressure is lost while the hydraulic fluid moves from the accumulator 32 to the boost pump 23.

A check valve 80 is positioned along the return line 25 downstream from the spare line 26 to protect against pulling fluid from this downstream section of the return line 25. This isolation adds robustness to the distributed hydraulic system 20 when it is attached to another hydraulic system, such as a central circuit that protects both circuits from unnecessary coupling. The check valve 80 assures that the hydraulic fluid in the return line 25 downstream from the spare line 26 does not move the wrong direction.

A bypass line 33 extends around the boost pump 23. In the event of failure of the boost pump 23, hydraulic fluid can be supplied to the boost line 24 through the bypass line 33. Check valves 80 are positioned along both the bypass line 33 and the line immediately downstream from the boost pump 23 to prevent the hydraulic fluid from flow in the wrong direction during periods of differing pressure differentials among the different sections of the hydraulic system 20.

The actuator 60 includes first and second chambers 61, 62 that are separated by a piston 63. A rod 66 extends from the piston 63 and is attached to the flight control member 11. Hydraulic fluid is introduced and removed from each of the first and second chambers 61, 62 to control the movement of the piston 63 and rod 66 and the connected flight control member 11.

Sensors are positioned to detect the pressure of the hydraulic fluid at various locations around the hydraulic system 20. Sensor 64 is positioned to sense the pressure of the hydraulic fluid in the first chamber 61. Sensor 65 is positioned to sense the pressure in the second chamber 62. A sensor 85 is positioned downstream from the boost pump 23 to detect the pressure of the hydraulic fluid being fed into the boost line 24. A sensor 85 can also be positioned along the supply line 22 to determine the pressure of the hydraulic fluid from the engine driven pump 21. Various types of sensors 64, 65, 85 can be used, including but not limited to pressure transducers.

Figure 7:
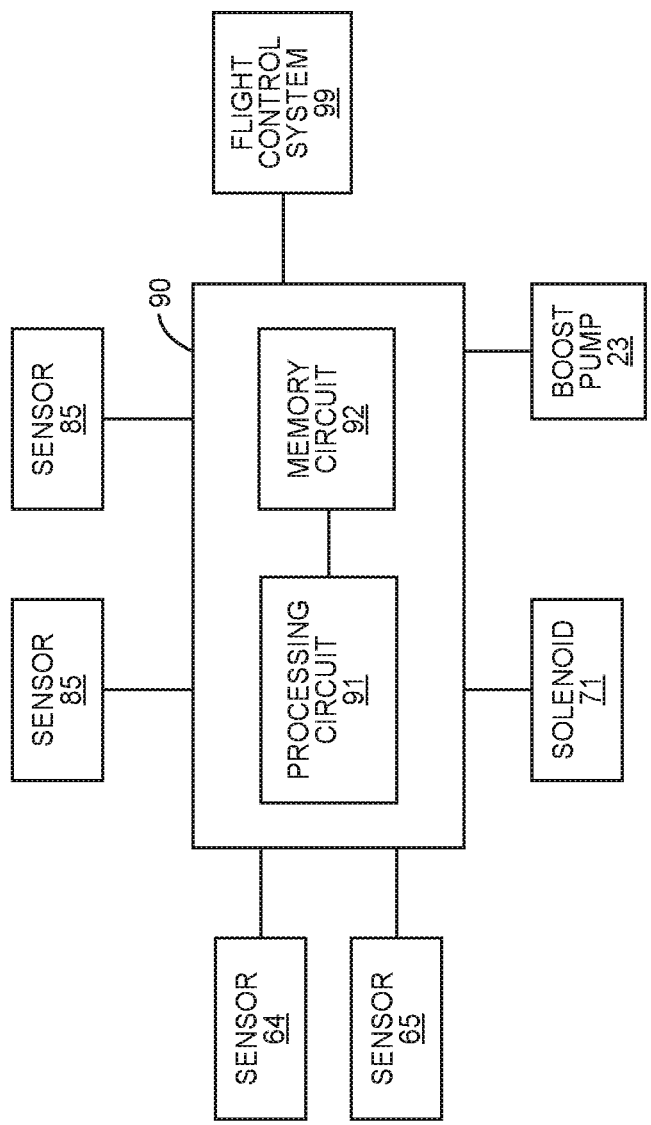
FIG. 7 is a schematic diagram of an actuation control unit.

An actuation control unit 90 can control the movement of hydraulic fluid through the hydraulic system 20. FIG. 7 illustrates an actuation control unit 90 that includes one or more processing circuits (shown as processing circuit 91) that may include one or more microprocessors, Application Specific Integrated Circuits (ASICs), or the like, configured with appropriate software and/or firmware. A computer readable storage medium (shown as memory circuit 92) stores data and computer readable program code that configures the processing circuit 91 to implement the techniques described above. Memory circuit 92 is a non-transitory computer readable medium, and may include various memory devices such as random access memory, read-only memory, and flash memory.

The actuation control unit 90 can receive signals from the sensors 64, 65, 85 positioned along the hydraulic system 20. The actuation control unit 90 can communicate with a flight control system 99 that controls one or more functions of the aircraft 10. The flight control system 99 can provide various data to the actuation control unit 90, such as but not limited to the commanded movements of the flight control member 11.

The actuation control unit 90 controls the movement of the hydraulic fluid through the hydraulic system 20 to position the flight control member 11 in its commanded position. The actuation control unit 90 uses inputs from the sensors 64, 65, 85 to control the boost pump 23 and valve 70 to supply the needed hydraulic fluid.

The valve 70 directs the supply hydraulic fluid into the actuator 60 through the feed lines and directs the hydraulic fluid from the actuator 60 to the return line 25. The valve 70 is adjustable between various positions to control the hydraulic fluid as necessary to ensure proper operation of the actuator 60 and movement of the flight control member 11. Valve 70 can be controlled by one or more solenoids 171 that are controlled by the actuation control unit 90.

Figure 8:
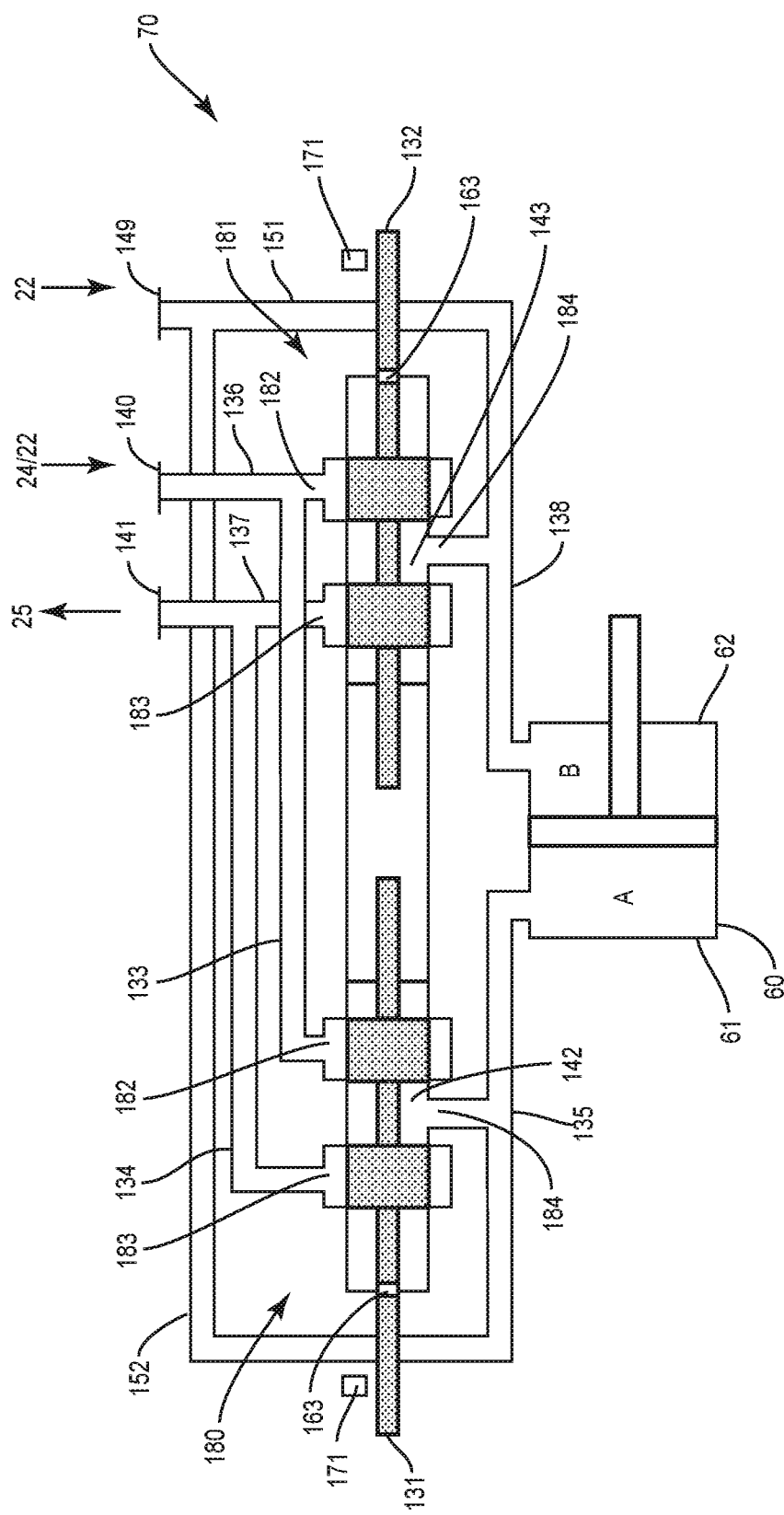
FIG. 8 is a schematic view of a dual spool valve.
Figure 9:
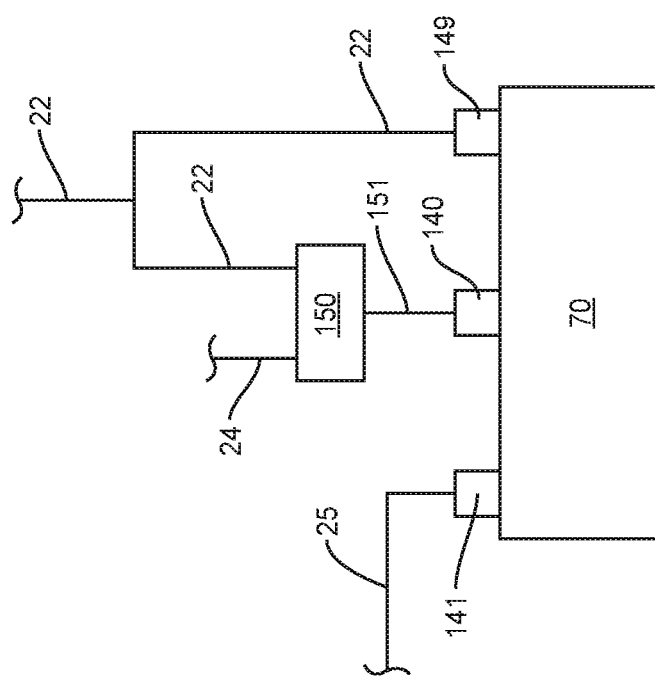
FIG. 9 is a schematic view of a manifold for supply lines of a hydraulic system.

FIG. 8 illustrates a valve 70 that controls the hydraulic fluid flow to and from the actuator 60. The valve 70 includes a first port 140 to receive hydraulic fluid, a second port 141 to discharge hydrauliuc fluid to the return line 25, and a third port 149 to receive hydraulic fluid. In one design, the boost line 24 and/or the supply line 22 supplies hydraulic fluid to the first port 140 and the supply line 22 supplies hydraulic fluid to the third port 149. As illustrated in FIG. 8, the supply line 22 can supply hydraulic fluid to both the first and third ports 140, 149. A manifold 150 as illustrated in FIG. 9 receives hydraulic fluid from both supply line 22 and boost line 24 and outputs the hydraulic fluid through line 151 and into the first port 140 of the valve 70. The manifold 150 can be integrated with the valve 70 or can be positioned upstream from the valve 70. The manifold 150 can include check valves and/or shuttle valves. In one design, the check valves include different cracking pressures to avoid cross talk between the pumps 21, 23.

As illustrated in FIG. 8, the valve 90 includes a first valve section 180 and a second valve section 181. The first valve section 180 includes a first manifold 142 and the second valve section 181 includes a second manifold 143. Each manifold 142, 143 includes a first supply port 182, a second return port 183, and a third actuator port 184.

A series of lines extend through the interior of the valve 70 to supply and return the hydraulic fluid. Line 133 extends between the first port 140 and the first manifold 142. Line 136 extends from the first port 140 to the second manifold 143. Line 134 extends between the first manifold 142 and the second port 141. Line 137 extends between the second manifold 143 and the second port 141. Line 135 extends between the first manifold 142 and the first chamber 61 of the actuator 60. Line 138 extends between the second manifold 143 and the second chamber 62 of the actuator 60. Line 151 extends between third port 149 and the second chamber 62 (through line 138). Line 152 extends between the third port 149 and the first chamber 61 (through line 135).

Figure 10:
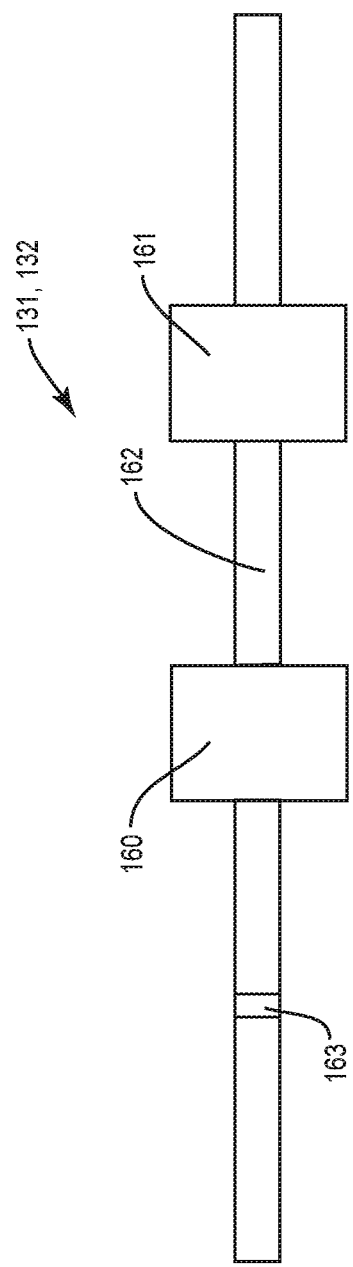
FIG. 10 is a side view of a spool for a dual spool valve.

The valve 70 is a dual spool valve that includes a first spool 131 and a second spool 132. Each of the spools 131, 132 is individually controllable and can be positioned regardless of the position of the opposing spool 131, 132. As illustrated in FIG. 10, the spools 131, 132 include a pair of blocks 160, 161 positioned along a shaft 162. The shaft 162 extends outward beyond each of the blocks 160, 161. An orifice 163 extends through the shaft 162. The second spool 132 can be the same as the first spool 131, just oriented in an opposing manner to be positioned in the second manifold 143. The first and second spools 131, 132 can include the same or different shapes and/or sizes. One design includes the first and second spools 131, 132 having the same shape and size.

Solenoids 171 are operatively connected to the first and second spools 131, 132 and are controlled by the actuation control unit 90. The solenoids 171 provide for positioning the first and second spools 131, 132 within the respective manifolds 142, 143. The first spool 131 controls the flow of hydraulic fluid into and out of a first chamber 61 of the actuator 60. The second spool 132 controls the flow of hydraulic fluid into and out of a second chamber 62. The movement of hydraulic fluid into and out of the chambers 61, 62 controls the movement of a piston 63 of the actuator 60 which is connected to the flight control member 11 and able to control an aspect of the flight of the aircraft 10.

FIG. 8 includes each of the first and second spools 131, 132. The first spool 131 is positioned with the blocks 160, 161 and a section of shaft 162 in the first manifold 142 with a section of the shaft 162 extending across line 152. The second spool 132 is positioned with the blocks 160, 161 and a section of shaft 162 in the second manifold 143 with a section of the shaft 162 extending across line 151.

The positioning of the valve 70 is also determined based on a commanded position received from the flight control system 99. The flight control system 99 or the actuation control unit 90 can determine a rate of the flight control member 11 which is the direction and speed required for the flight control member 11 to be moved to control the flight of the aircraft 10.

Figure 11:
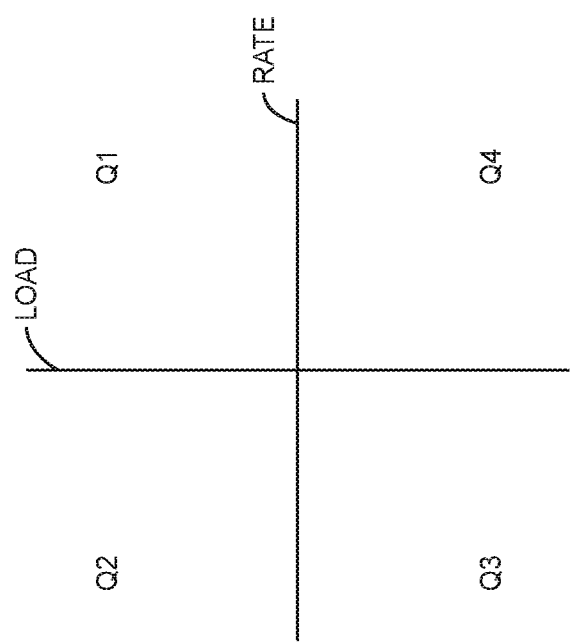
FIG. 11 is a diagram of a load and rate applied to an actuator.

FIG. 11 illustrates a diagram of the forces acting on the piston 63 through the flight control member 11 that affect the required movement of hydraulic fluid through the hydraulic system 20. A first axis (i.e., the x-axis) represents the rate of movement of the piston 63 and thus the flight control member 11. The rate can be either positive when the piston 63 moves in a first direction and negative when the piston 63 moves in the opposing second direction. The second axis (i.e., the y-axis) is the load placed on the piston 63 through the flight control member 11. The load can be positive when applied to the piston 63 in a first direction and negative when applied in a second direction. The diagram of FIG. 11 includes the four quadrants Q1, Q2, Q3, and Q4 based on the rate and load requirements.

The actuation control unit 90 uses one or more of the sensed pressures of the hydraulic fluid in one or both of the first and second chambers 61, 62 and along one or more of the supply line 22 and boost line 24 in combination with the commanded rate from the flight control system 99 to determine the positions of the first and second spools 131, 132 and then derive the mode.

Figure 12:
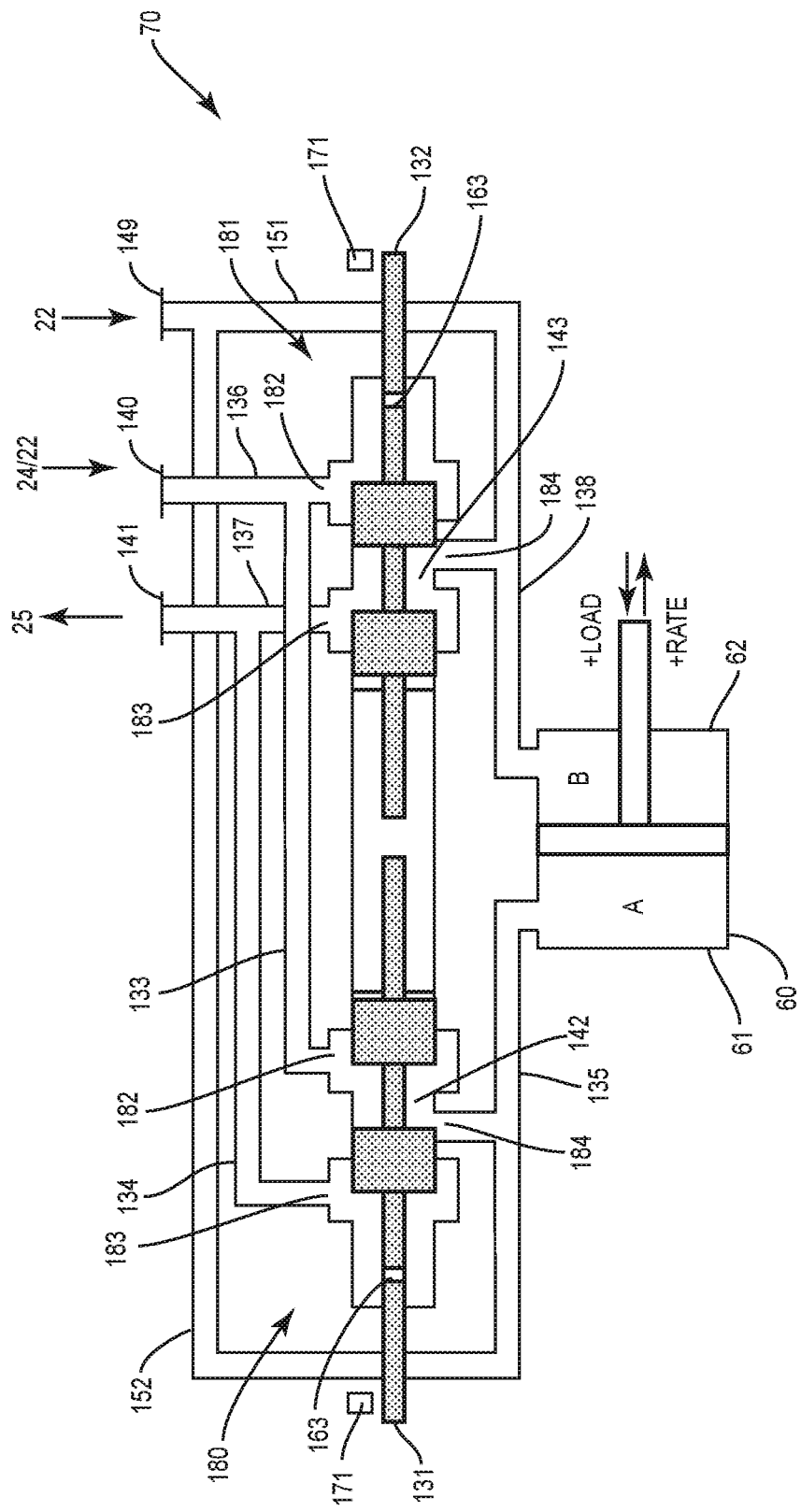
FIG. 12 is a schematic view of a dual spool valve providing first quadrant control to an actuator.

FIG. 12 illustrates the actuator 60 within the first quadrant Q1 with a positive load and a positive rate. In the first quadrant Q1, the rate is controlled by the flow of hydraulic fluid through the port 140 and into the first chamber 61. As illustrated, the first spool 131 is positioned in a second position for hydraulic fluid from the supply line 22 to enter into the first chamber 61 through lines 133-135. The first spool 131 also blocks port 183. The second spool 132 is in a first position to open the port 183 of the second chamber 62 to allow hydraulic fluid to exit to the return line 25 through lines 138-137. The second spool 132 also blocks port 182 in this first position.

The shaft 162 of the first spool 131 extends across line 152 thus preventing hydraulic fluid from entering or exiting the first chamber 61 through the line 152. Shaft 162 of the second spool 131 extends across line 151 and prevents hydraulic fluid from entering or exiting the second chamber 62 through line 151.

Figure 13:
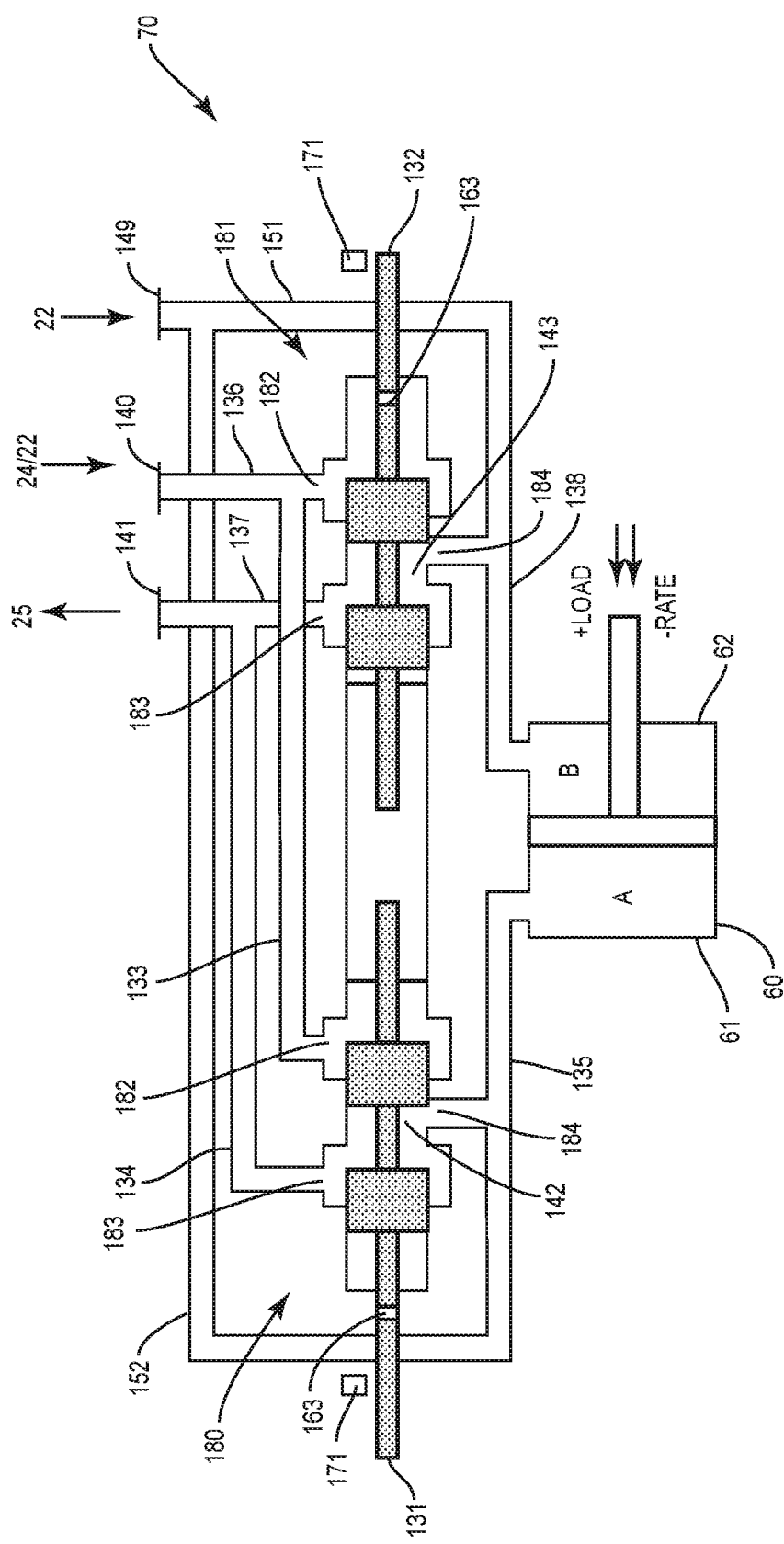
FIG. 13 is a schematic view of a dual spool valve providing second quadrant control to an actuator.

FIG. 13 illustrates the actuator 60 within the second quadrant Q2 having a positive load applied to the piston 63 and a negative rate. In the second quadrant Q2, the rate is controlled by the flow of hydraulic fluid out of the first chamber 61. Instead of outputting the hydraulic fluid from the first chamber 61 to the return line 25, the exiting hydraulic fluid is directed from the first chamber 61 to the second chamber 62. Regenerating the hydraulic fluid from the first chamber 61 to the second chamber 62 reduces the number of pressure cycles that are required to otherwise introduce hydraulic fluid into the second chamber 62 of the actuator 60 from the supply line 22 and move the hydraulic fluid into and through the return line 25. As illustrated, the first spool 131 is in a first position that opens port 183 and blocks port 182. The second spool 132 is in the first position to open port 183 and block port 182. This allows hydraulic fluid from the first chamber 61 to move to the second chamber 62. The movement of the hydraulic fluid to the second chamber 62 can be caused by a pressure drop in the second chamber 62 due to the movement of the piston 63 towards the first chamber 61.

In the second quadrant Q2, the shaft 162 of the first spool 131 extends across line 152 thus preventing hydraulic fluid from entering or exiting the first chamber 61 through the line 152. Shaft 162 of the second spool 131 extends across line 151 and prevents hydrauliuc fluid from entering or exiting the second chamber 62 through line 151.

Figure 14:
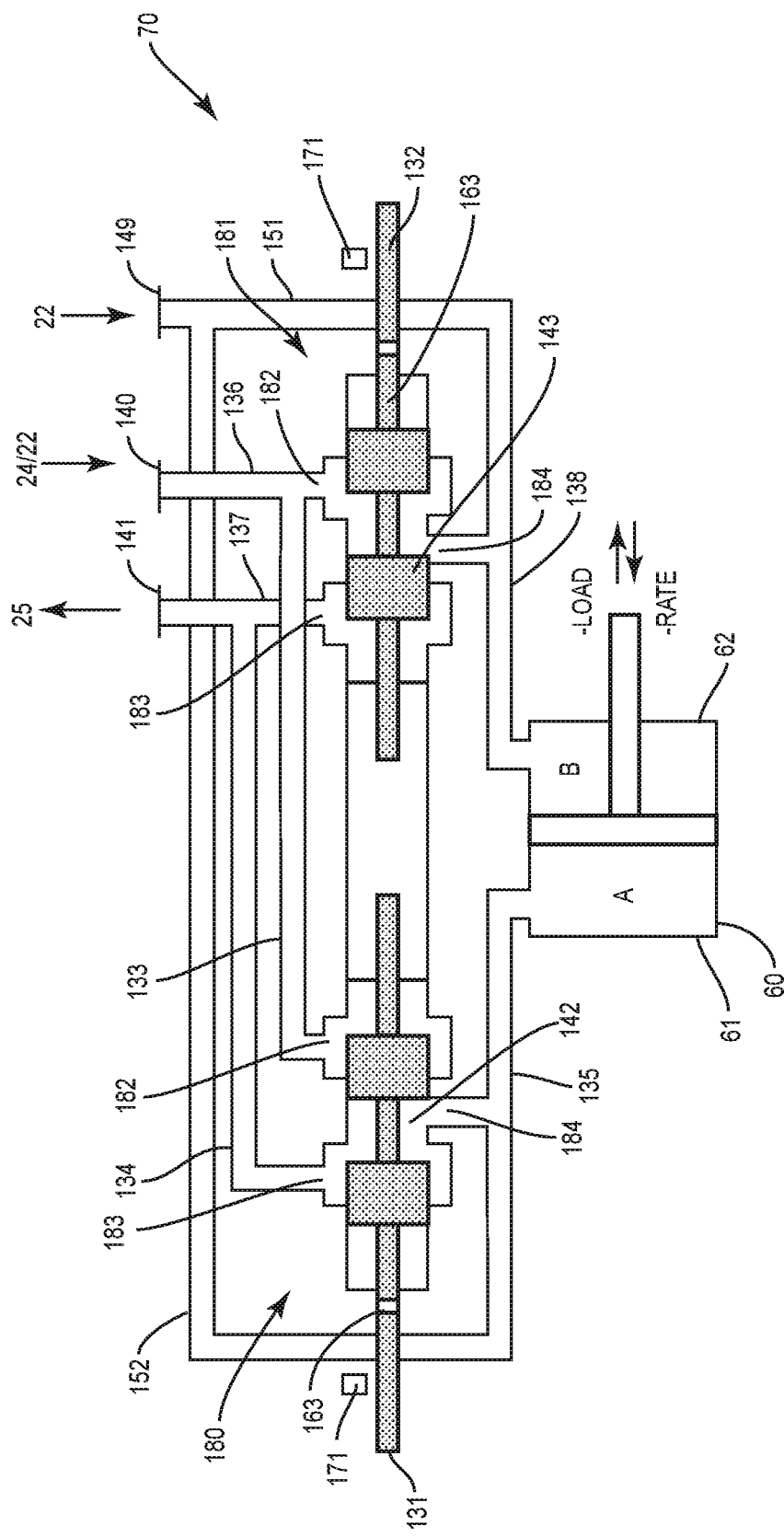
FIG. 14 is a schematic view of a dual spool valve providing third quadrant control to an actuator.

FIG. 14 illustrates the actuator 60 within the third quadrant Q3 having a negative load and a negative rate. In the third quadrant Q3, the rate is controlled by the flow of hydraulic fluid into the second chamber 62 from the first port 140. The first spool 131 is in the first position to open port 183 and block port 182. The second port is in the second position to block port 183 and open port 182. The second spool 132 is positioned for hydraulic fluid from the supply line 22 to move through lines 136-138 and into the second chamber 62. The first spool 131 is positioned for the hydraulic fluid to exit the first chamber 61 to the return line 25 through lines 135-134. The shaft 162 of the first spool 131 extends across line 152 thus preventing hydraulic fluid from entering or exiting the first chamber 61 through the line 152. Shaft 162 of the second spool 131 extends across line 151 and prevents hydraulic fluid from entering or exiting the second chamber 62 through line 151.

Figure 15:
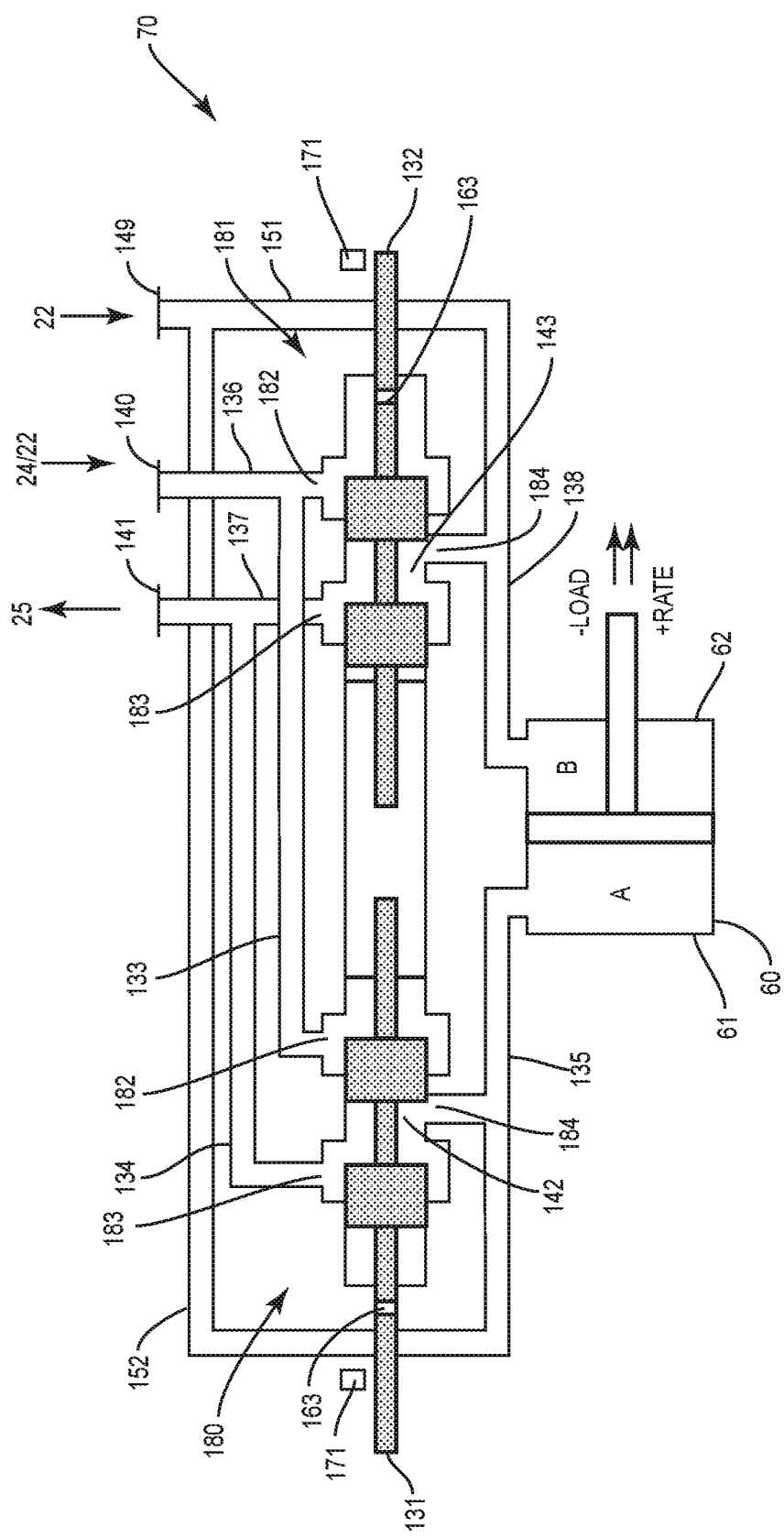
FIG. 15 is a schematic view of a dual spool valve providing fourth quadrant control to an actuator.

FIG. 15 illustrates the actuator 60 within the fourth quadrant with a negative load and a positive rate. In the fourth quadrant Q4, the rate is controlled by the flow of hydraulic fluid out of the second chamber 62. The first spool 131 is in the first position to open port 183 and block port 182. The second spool 132 is in the first position to open port 183 and block port 182. The second spool 132 is positioned to allow hydraulic fluid to flow out of the second chamber 62 through lines 138-137. The first spool 131 is positioned for the hydraulic fluid to move through lines 134-135 and into the first chamber 61. Again, this configuration regenerates the existing hydraulic fluid within the actuator 60 and thus reduces the number of needed pressure cycles to move hydraulic fluid through supply line 22 into the actuator 60 and out of the actuator 60 and through the return line 25. The shaft 162 of the first spool 131 extends across line 152 thus preventing hydraulic fluid from entering or exiting the first chamber 61 through the line 152. Shaft 162 of the second spool 131 extends across line 151 and prevents hydraulic fluid from entering or exiting the second chamber 62 through line 151.

The valve 70 provides for the actuation control unit 90 to have four quadrant control of the actuator 60. The actuation control unit 90 controls the solenoids 171 to position the first and second spools 131, 132 accordingly to provide for the control. Table 1 below lists the quadrants in which a boost is supplied by the hydraulic fluid entering through the supply line 22. The determination of boost is based on the hydraulic fluid P entering through the supply line 22, hydraulic fluid A in the first chamber 61, and the hydraulic fluid B in the second chamber 62. Table 2 includes the valve positioning for movement of the fluid for control of the actuator 60.

TABLE 1

| Boost Quadrants | Negative Rate | Positive Rate |
| --- | --- | --- |
| Positive force | Q2: A ≥ B, no boost | Q1: P ≥ A + δP |
| Negative force | Q3: P ≥ B + δP | Q4: B ≥ A, no boost |

TABLE 2

| Control Quadrants | Negative Rate | Positive Rate |
| --- | --- | --- |
| Positive force | Q2: regeneration A – B | Q1: P – A & B – T |
| Negative force | Q3: P – B & A – T | Q4: regeneration B – A |

For quadrant 1 Q1 (see FIG. 12), control occurs through hydraulic fluid entering into the first chamber 61 through the port 140. This includes the movement of hydraulic fluid from the supply line 22 to the first chamber 61 (P–A) and the movement of hydraulic fluid from the second chamber 62 to the return line 25 (B–T). A boost is applied when the pressure at the supply line 22 is less than the pressure at the first chamber 61 plus a margin (P≥A+δP). The margin provides for application of the load above the required pressure to account for various forces on the hydraulic fluid, such as surface friction and surface-inertia acceleration. One design includes a system pressure of 1200 psi and the margin is 300 psi.

For quadrant 2 Q2, no boost is required from the hydraulic fluid entering through the supply line 22 since the pressure A in the first chamber 61 is greater than or equal to the pressure B in the second chamber 62 (A≥B). Control in the second quadrant Q2 occurs through hydraulic fluid exiting the first chamber 61 and entering the second chamber 62 (A–B).

For quadrant 3 Q3, control occurs through the movement of hydraulic fluid from the supply line 22 into the second chamber 62 (P–B) and movement of hydraulic fluid from the first chamber 61 to the return line 25 (A–T). A boost is applied when the pressure at the supply line 22 is less than the pressure at the second chamber 62 plus the margin (P≥B+δP).

For quadrant 4 Q4, no boost is required from the hydraulic fluid entering through the supply line 22 since the pressure B in the second chamber 62 is greater than or equal to the pressure A in the first chamber 61 (B≥A). Control in the fourth quadrant Q4 occurs through hydraulic fluid exiting the second chamber 62 and entering the first chamber 62 (B–A).

In each of the quadrants, the shafts 162 of the spools 131, 132 extend across lines 151, 152 respectively to prevent hydraulic fluid from flowing through these lines into or out of the actuator 60.

Figure 16:
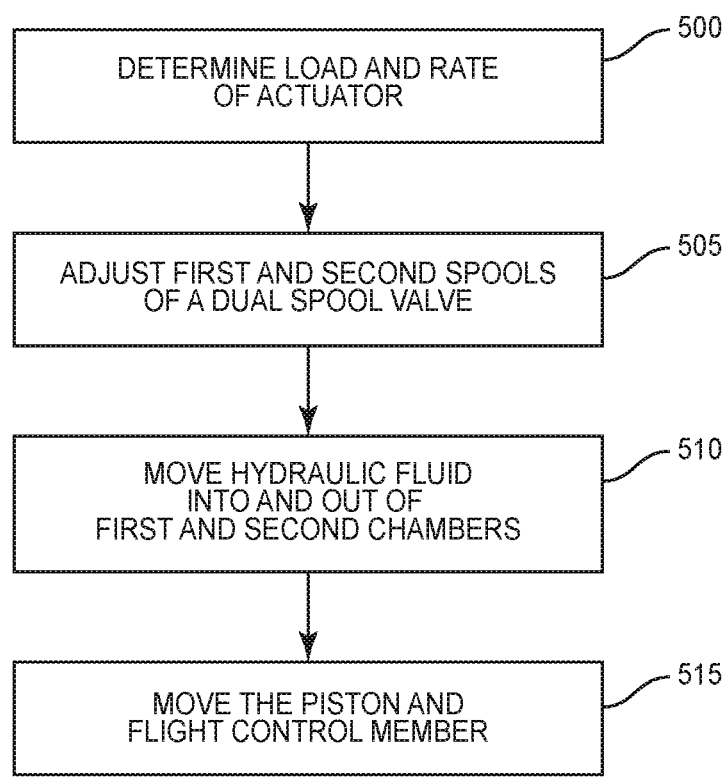
FIG. 16 is a flowchart diagram of a method of controlling a valve to move hydraulic fluid into and out of an actuator.

FIG. 16 illustrates a method of controlling the valve 70 to change the orientation of the flight control member 11. The load and commanded rate of the actuator 60 is determined by the actuation control unit 90 (block 500). The commanded rate can be a function of a commanded position instruction received from the flight control system 99. The load can be determined based on the pressure of the hydraulic fluid in one or both of the first and second chambers 61, 62. The actuation control unit 90 then signals the solenoids 171 to position the first and second spools 131, 132 (block 505). The hydraulic fluid is then moved into and out of the first and second chambers 61, 62. Dependent upon the quadrant, this can include introducing hydraulic fluid from the supply line 22 and/or moving the hydraulic fluid between the first and second chambers 61, 62. The moving hydraulic fluid causes the piston 63 of the actuator 60 to move the flight control member 11 (block 515).

The valve 70 is further configured to operate with four quadrant control of the actuator 60 in the event of a failure of one of the valve sections 180, 181. A failure can include but is not limited to a difference in sensed pressure between the boost pump pressure and the pressure within one or both the first and second chambers 61, 62, and sensing that the position of one of the first or second spools 131, 132 does not change when commanded to a different position.

In one design, upon detecting a failure in the valve 70 of one of the valve sections 180, 181, the actuation control unit 90 can revert back to non-differential control of the valve 70. This can include operating the boost pump 23 at an intermediate pressure of 5000 psi. This intermediate pressure is well below its peak capability of 8000-9000 psi. The engine driven pump 21 can be operated at 3000 psi rather than 1200 psi.

FIGS. 17-20 illustrate the positioning of the valve 70 in the event that of failure of the second valve section 181. As illustrated, the second spool 132 goes to a third position in which the orifice 163 is aligned with the line 151. This positioning allows for the flow of hydraulic fluid along line 151 and through the orifice 163 and into and out of the second chamber 62. In one design, the second spool 132 is biased towards the third position. When the valve section 181 is functioning properly, the solenoid 171 maintains the second spool 132 in one of the first and second positions as disclosed above. In the event of a failure, the solenoid 171 can be de-energized causing the second spool 132 to go to the third position. The third position also includes the second spool 132 positioned to prevent hydraulic fluid from moving through the second manifold 143 to or from the second chamber 62. This can include a block 160 positioned across the actuator port 184. With the second valve section 181 being in the third position, the first valve section 180 is adjustable to control the flow of hydraulic fluid into and out of the first chamber 61.

Figure 17:
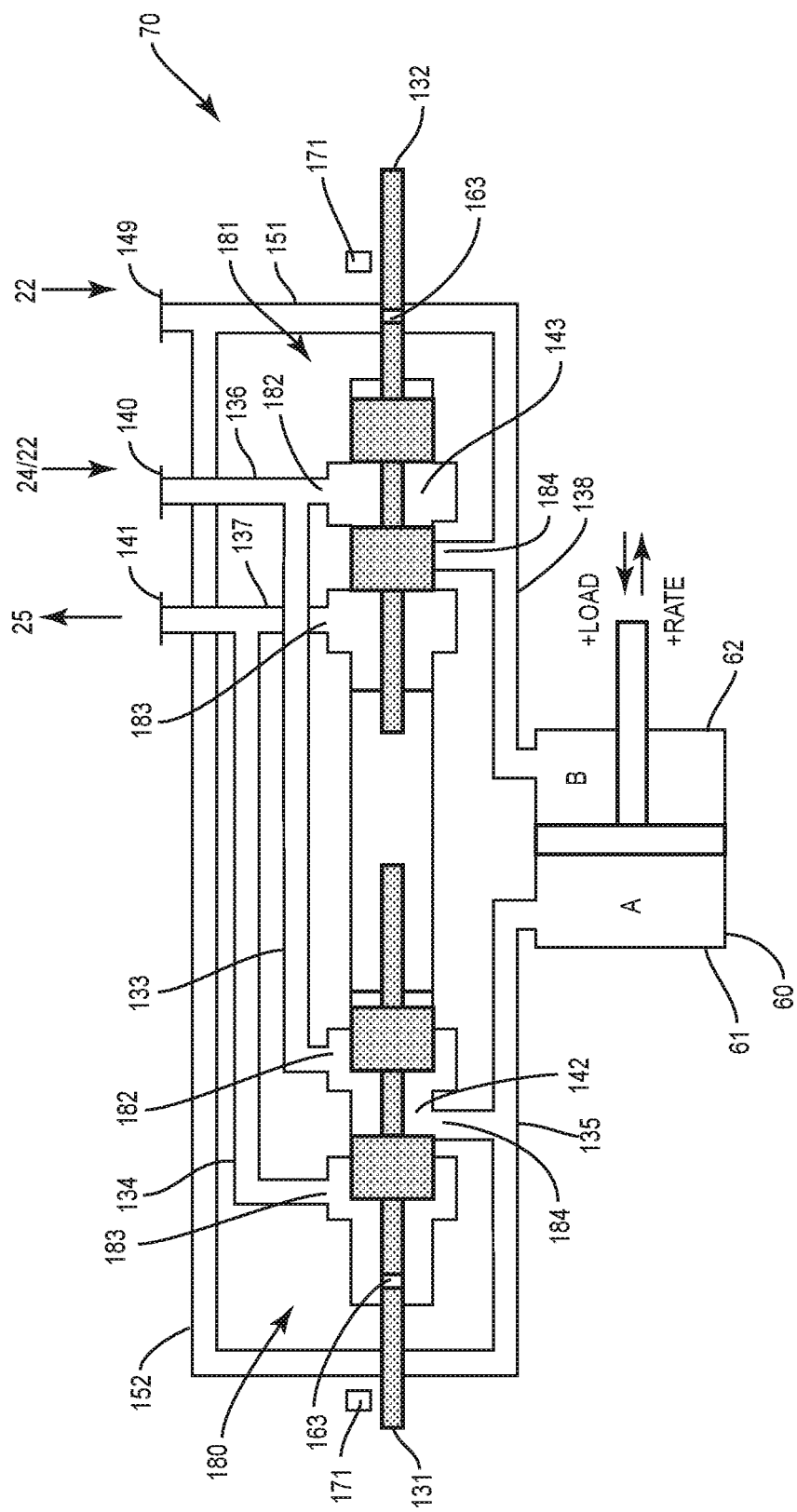
FIG. 17 is a schematic view of a dual spool valve providing first quadrant control to an actuator.

FIG. 17 illustrates control with the actuator 60 operating in the first quadrant Q1. This includes a positive load and a positive rate. In this example, the second valve section 181 has failed and the solenoid 171 is de-energized and the second spool 132 is in the third position with the orifice 163 aligned with the line 151. Control in the first quadrant Q1 occurs through hydraulic fluid moving into the first chamber 61. The pressure in the first chamber 61 is greater than the pressure in the second chamber 62. The first spool 131 is in the second position which supplies hydraulic fluid from the first port 140 through lines 133-135 through port 182 of the first manifold 142. Fluid is able to flow out of the second chamber 62 due to the alignment of the orifice 163 with the line 151.

Figure 18:
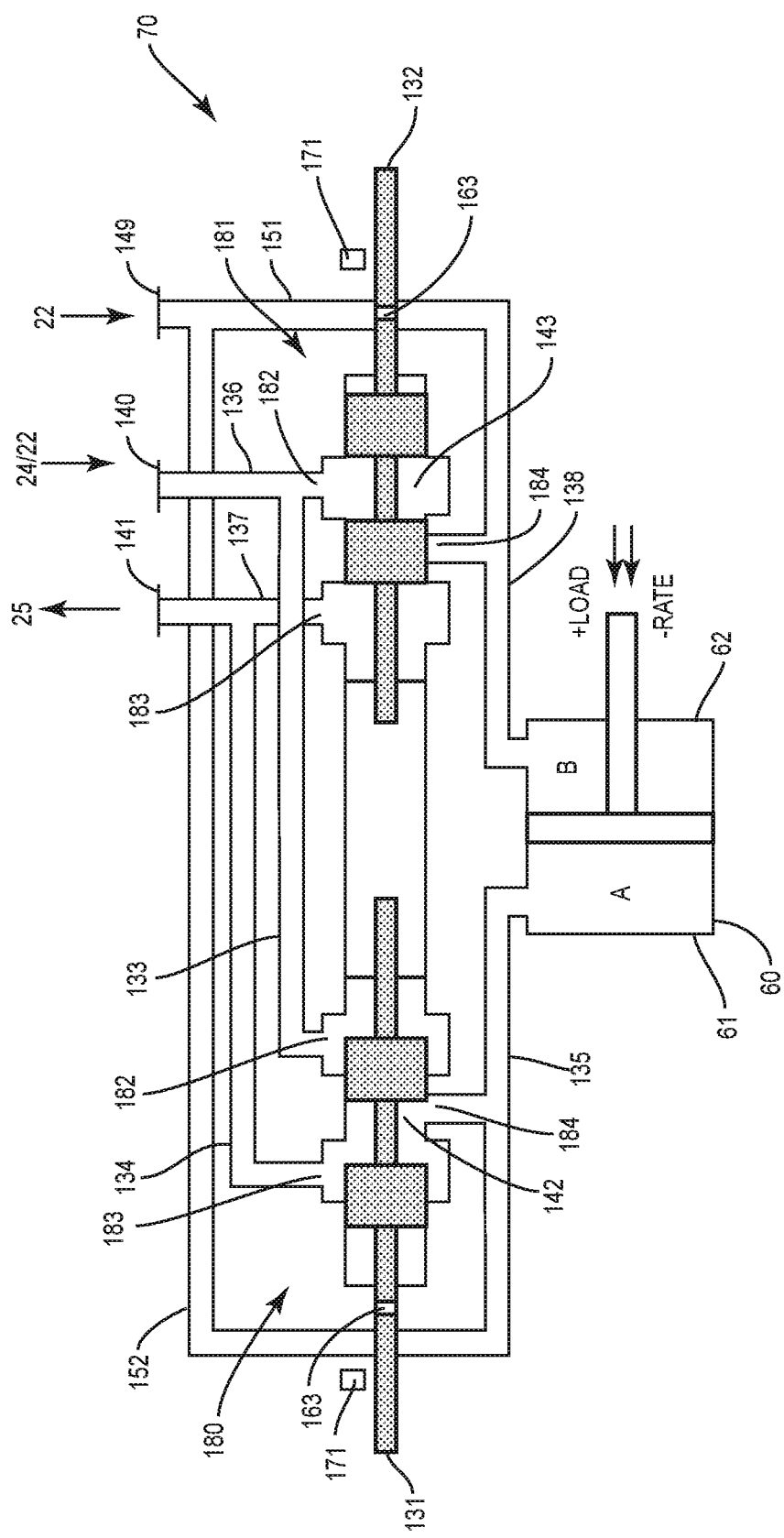
FIG. 18 is a schematic view of a dual spool valve providing second quadrant control to an actuator.

FIG. 18 illustrates control with the actuator 60 operating in the second quadrant Q2. This includes a positive load and a negative rate. The second valve section 181 has failed and the solenoid 171 is de-energized and the second spool 132 is in the third position with the orifice 163 aligned with the line 151. Control in the second quadrant Q2 occurs through hydraulic fluid moving out of the first chamber 61. The pressure in the second chamber 62 is greater than the pressure in the first chamber 61. The first spool 131 is in the first position which opens port 183 and allows hydraulic fluid to move out of the first chamber 61 through lines 135-134 to port 141. Hydraulic fluid is supplied to the second chamber 62 through line 151 due to the alignment of the orifice 163 with the line 151.

Figure 19:
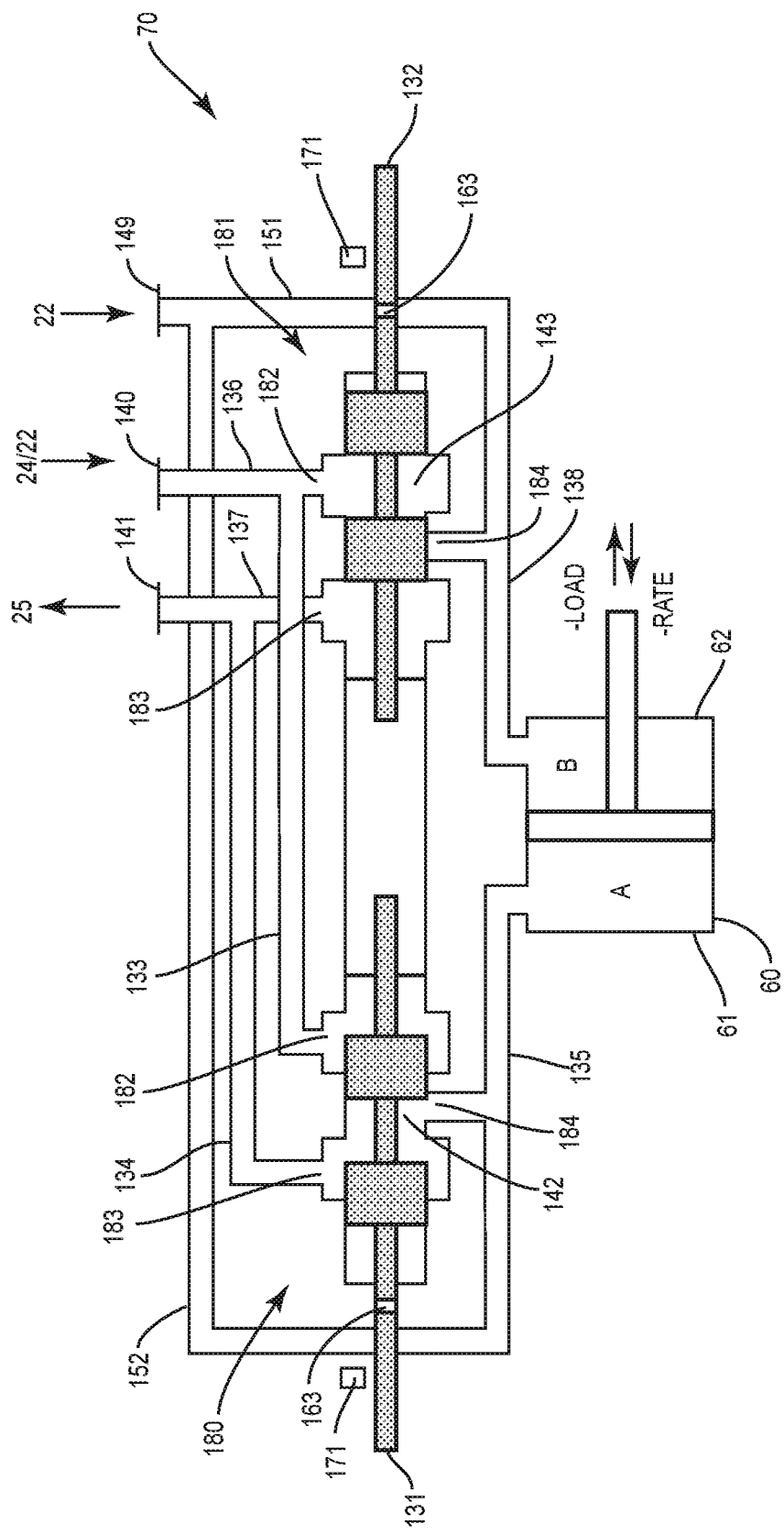
FIG. 19 is a schematic view of a dual spool valve providing third quadrant control to an actuator.

FIG. 19 illustrates control with the actuator 60 operating in the third quadrant Q3. This includes a negative load and a negative rate. The second valve section 181 has failed and the solenoid 171 is de-energized and the second spool 132 is in the third position with the orifice 163 aligned with the line 151. Control in the third quadrant Q3 occurs through hydraulic fluid moving out of the first chamber 61. The pressure in the second chamber 62 is greater than the pressure in the first chamber 61. The first spool 131 is in the first position which opens port 183 and allows hydraulic fluid to move out of the first chamber 61 through lines 135-134 to port 141. Hydraulic fluid is supplied to the second chamber 62 through line 151 due to the alignment of the orifice 163 with the line 151.

Figure 20:
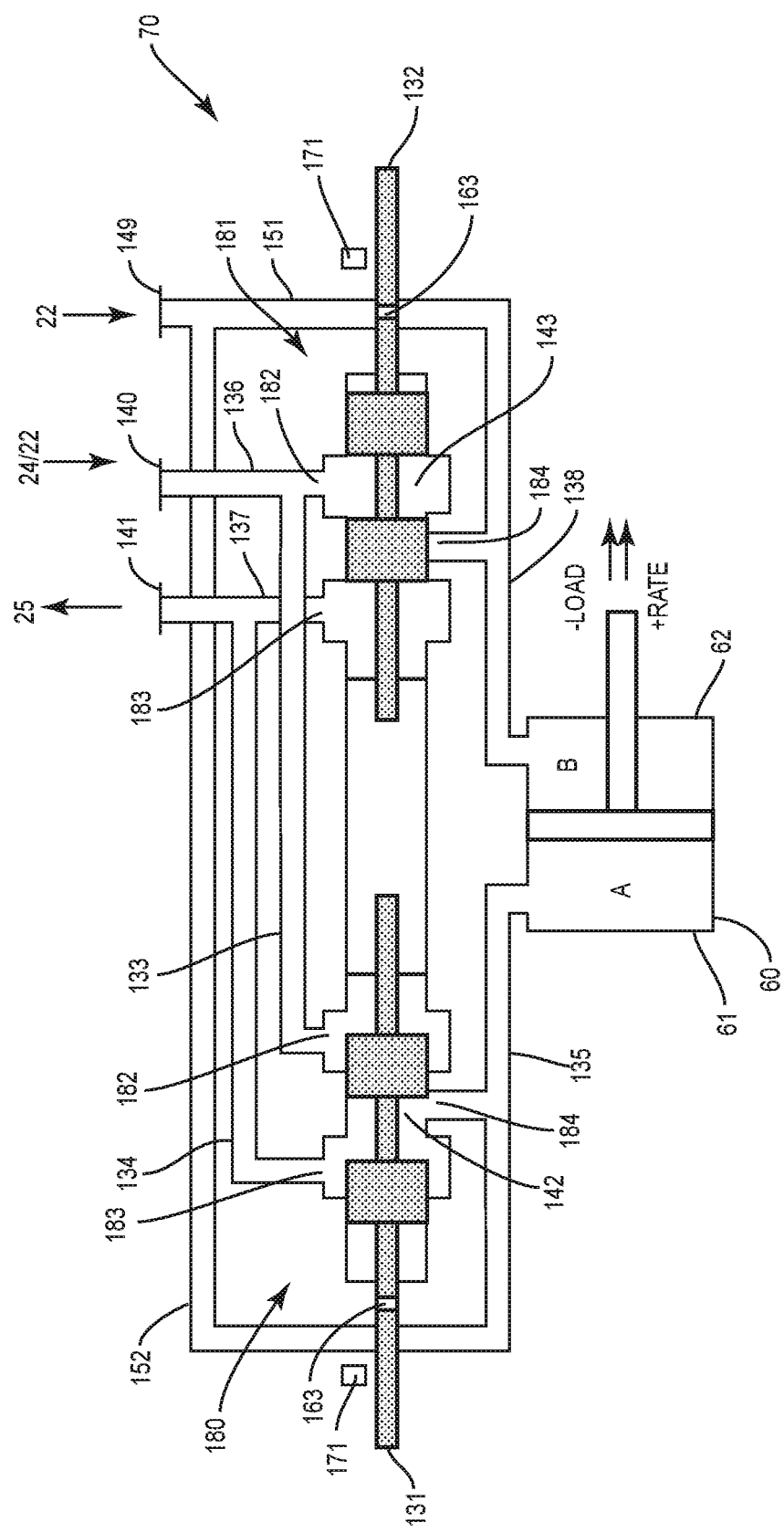
FIG. 20 is a schematic view of a dual spool valve providing fourth quadrant control to an actuator.

FIG. 20 illustrates control with the actuator 60 operating in the fourth quadrant Q4. This includes a negative load and a positive rate. The second valve section 181 has failed and the solenoid 171 is de-energized and the second spool 132 is in the third position with the orifice 163 aligned with the line 151. Control in the fourth quadrant Q4 is controlled through the hydraulic fluid moving out of the second chamber 62 that moves through the orifice 163 of the second spool 132. The size and/or alignment of the orifice 163 controls the amount of hydraulic fluid that can pass from the second chamber 62 along lines 138-151. This control is a result of the pressure in the second chamber 62 being greater than the pressure in the first chamber 61.

Figure 21:
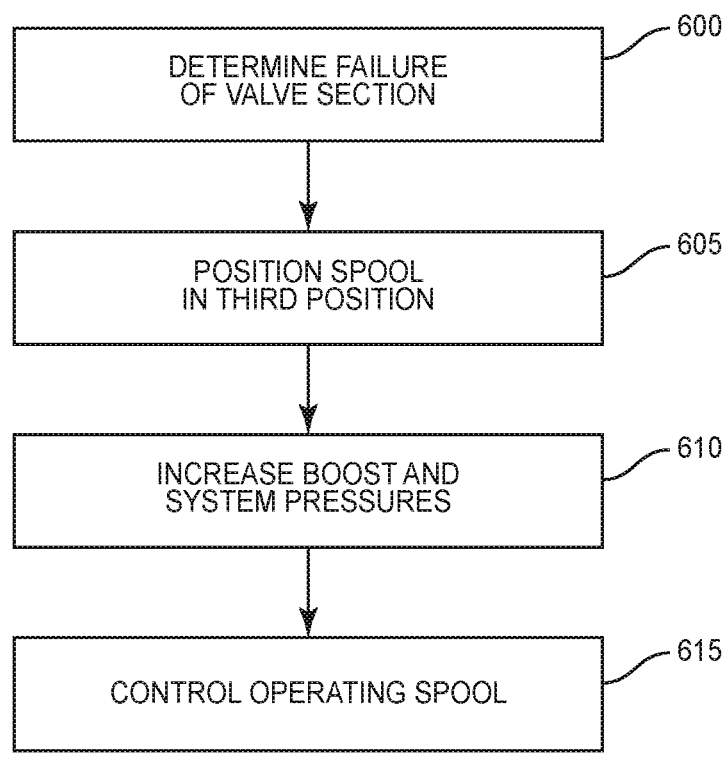
FIG. 21 is a flowchart diagram of a method of controlling a valve to move hydraulic fluid into and out of an actuator.

FIG. 21 illustrates a method of operating the valve 70 during a failure occurrence. The actuation control unit 90 determines a failure of one of the valve sections 180, 181. This can include: determining an unexpected difference along a supply line 22, 24 and one or both of the first and second chambers 61, 62; determining that one of the spools 131, 132 is not moving between the commanded positions; and other fault situations with the valve 70 (block 600). The failed spool 131, 132 is moved to the third position (block 605). This can include de-energizing the solenoid 70 that controls the spool 131, 132 and causing it to move to the third position. The actuation control unit 90 can also increase the pressure of the hydraulic fluid supplied to the valve 70 (block 610). This can include increasing the system pressure supplied through the engine driven pump 21 and the boost pressure supplied through the boost pump 23. The actuation control unit 90 operates the functioning spool 131 or 132 to operate according to the quadrant requirements explained above in FIGS. 17-20.

The hydraulic system 20 can supply hydraulic fluid to more than one actuator 60. The multiple actuators 60 can be connected to one or more flight control members 11. In one design, the hydraulic system 20 supplies fluid to multiple actuators 60 located along a wing of the aircraft 10 that control the movement of multiple flight control members 11 along the wing.

Boost control when a hydraulic system 20 supports multiple actuators provides for determining an error for each of the actuators. The largest error amongst the support actuators 60 is then used to control the system pressure. This ensures that the hydraulic system 20 is able to adequately support each of the actuators 60. For each actuator, the error in the first quadrant Q1 is $e=(A+\delta P)-P$. In the third quadrant Q3, the error $e=(B+\delta P)-P$. For the second and fourth quadrants Q2, Q4, the error is equal to zero.

Figure 22:
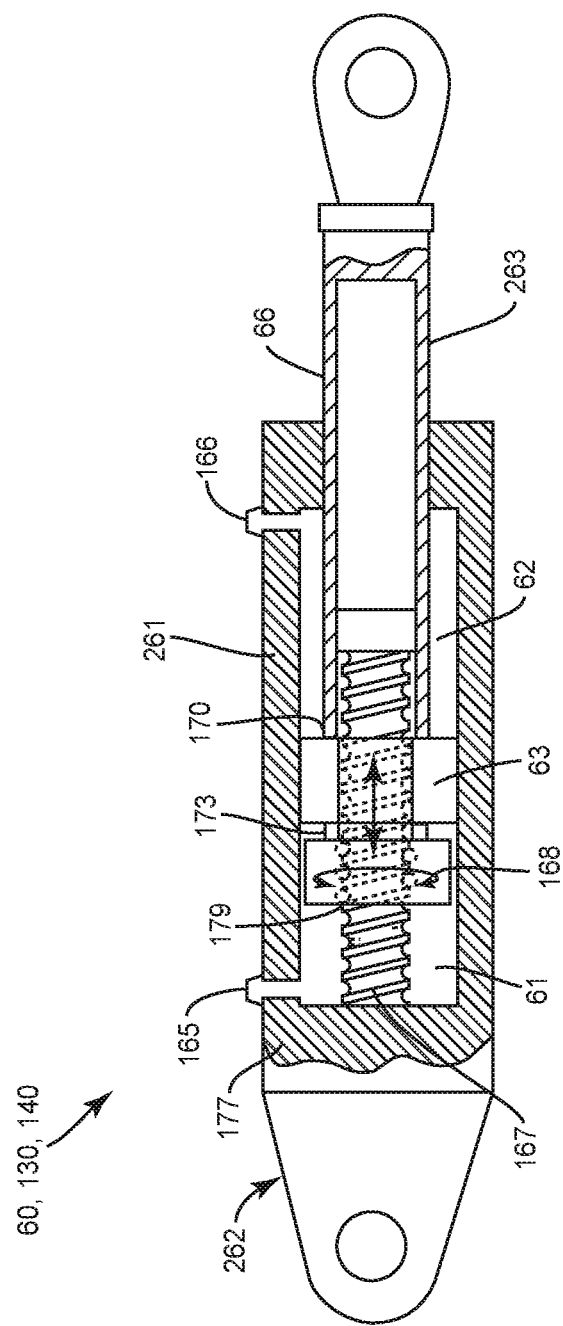
FIG. 22 is a schematic section view of an actuator.
Figure 23:
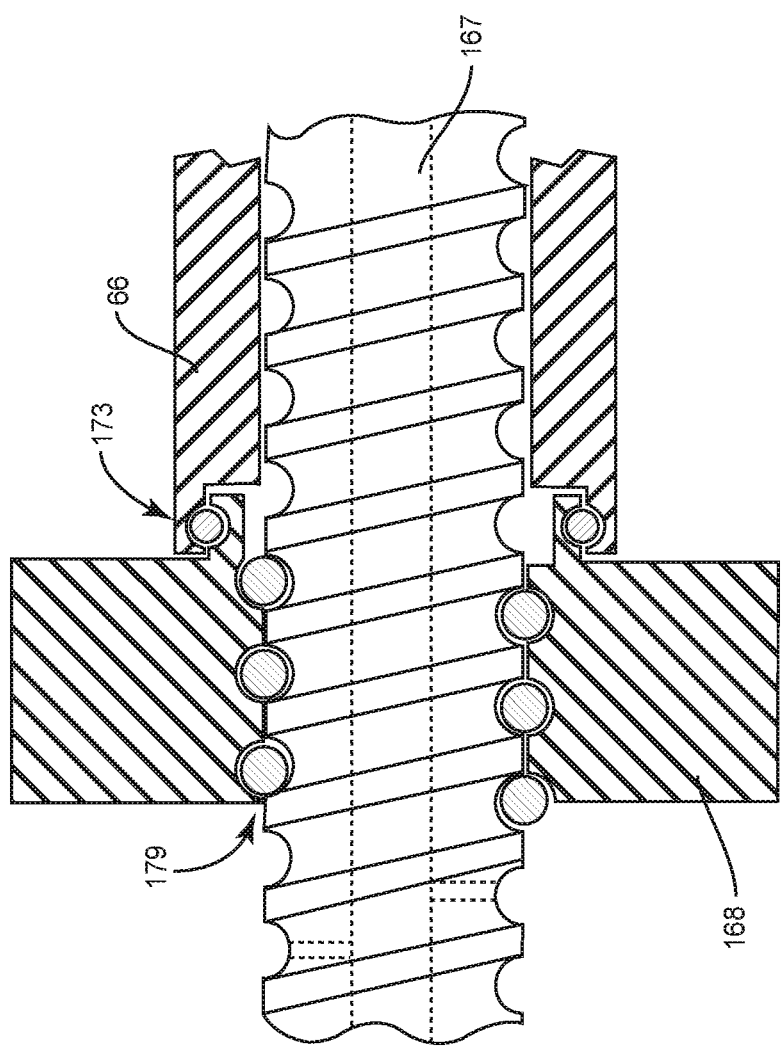
FIG. 23 is a magnified view of a section of the actuator of FIG. 22.

A variety of different hydraulic actuators 60 can be used to move the flight control members 11. One actuator 60 includes an integrated inerter as illustrated in FIGS. 22 and 23. The actuator 60 includes a first terminal 262 that includes a housing 261, and a second terminal 263 that includes the rod 66. Each of the first and second terminals 262, 263 can be configured to attached to either a structural members in the aircraft 10 or the flight control member 11. The housing 261 extends around and encloses the first and second chambers 61, 62. The first chamber 61 includes a port 165 and the second chamber 62 includes a port 166. The ports 165, 166 provide for the hydraulic fluid to flow into and out of each of the first and second chambers 61, 62. A threaded shaft 167 extends outward from an end wall 177 and into the first chamber 61. A flywheel 168 is threaded onto the threaded shaft 167 and is movable by relative rotation along the length. The flywheel 168 rotates in proportion to an axial rate of the rod 66 that extends through an opening in an end wall of the housing 261. The rod 66 includes an inner end 170 that is hollow and extends around the threaded shaft 167.

The piston 63 is mounted to the inner end of the rod 66. The piston 63 includes an outer diameter that substantially matches the inner diameter of the first and second chambers 61, 62. A seal (not illustrated) such as an O-ring can extend around the outer perimeter of the piston 63 to seal against the wall of the first and second chambers 61, 62. The piston 63 is axially slidable within the chambers 61, 62. The piston 63 can provide for an unbalanced setting with one of the sides of the piston 63 having a greater cross-sectional area than the opposite piston side. The piston 63 can also be balanced with the opposing sides have the same cross-sectional area. The piston 63 also includes an inner opening that extends around the shaft 167.

The flywheel 168 is mounted in the first chamber 61 and is rotatably coupled to the piston 63 at a flywheel annulus 179. The flywheel 168 is configured to rotationally accelerate in proportion to axial acceleration of the piston 63 and piston rod 66 relative to the shaft 167. A bearing 173 can be positioned along the shaft 167 between the flywheel 168 and the piston 63.

FIG. 23 illustrates a magnified sectional view of FIG. 22 illustrating the flywheel 168 coupled to the rod 66 at the flywheel annulus 179. The flywheel annulus 179 is also threadably engaged to the shaft 167. The shaft 167 can be configured as a ball screw with helical grooves for receiving ball bearings which couple similarly-configured helical grooves in the flywheel annulus 179 to the ball screw with minimal friction. Although not illustrated, the flywheel annulus 179 can include a ball nut for circulating the ball bearings coupling the flywheel 168 to the ball screw. In another example not shown, the threaded shaft 167 can include a lead screw with threads to which the flywheel annulus 179 is directly engaged. The flywheel 168 can be configured for engagement to any one of a variety of different types of configurations of threaded shafts, and is not limited to the ball screw.

FIG. 23 also illustrates a bearing 173 for coupling the flywheel annulus 179 to the rod 66 such that the rod 66 and flywheel 168 can translate in unison as the flywheel 168 rotates due to threadable engagement with the threaded shaft 167. Although the bearing 173 is shown as a bearing, the bearing 173 can be provided in any one a variety of different configurations capable of axially coupling the flywheel 168 to the rod 66 with a minimal amount of axial free play. For example, the bearing 173 can be configured as a roller bearing (not shown). In still further examples, the flywheel 168 can be coupled to the rod 66 without a bearing while still allowing the flywheel 168 to rotate during translation of the rod 66 and flywheel 168 relative to the threaded shaft 167.

Figure 24:
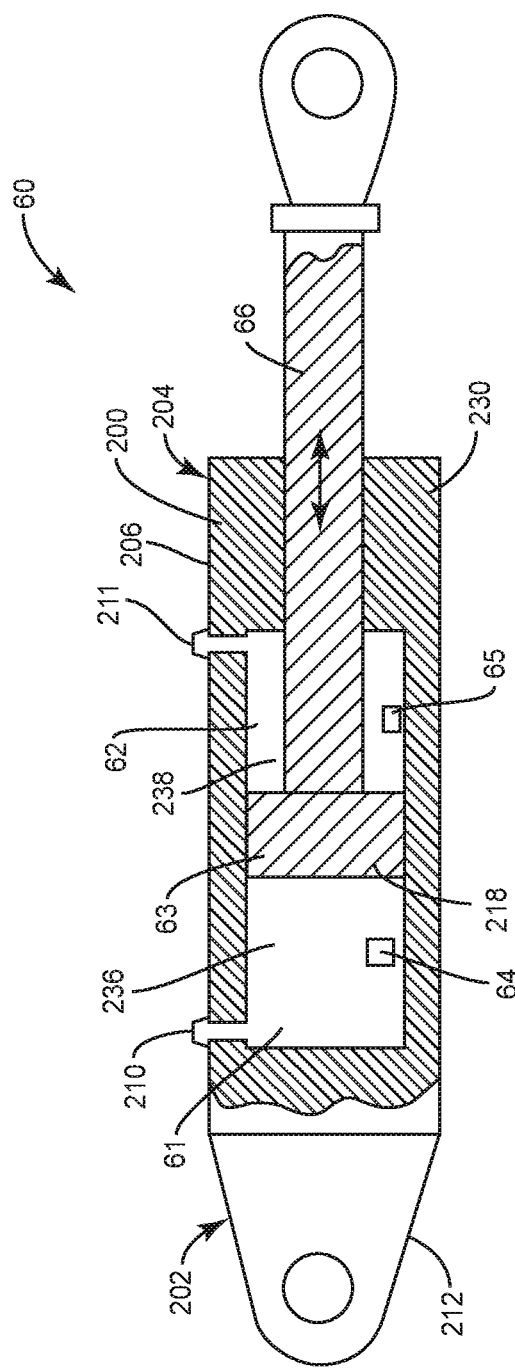
FIG. 24 is a schematic sectional view of an actuator.

FIG. 24 illustrates an actuator 60 that can extend between a support member and a flight control member 11. The actuator 60 includes a housing 200 that extends around and forms an interior chamber. The piston 63 extends across and divides the chamber into the first chamber 61 and the second chamber 62. A first port 210 leads into the first chamber 61 and a second port 211 leads into the second chamber 62.

Figure 25:
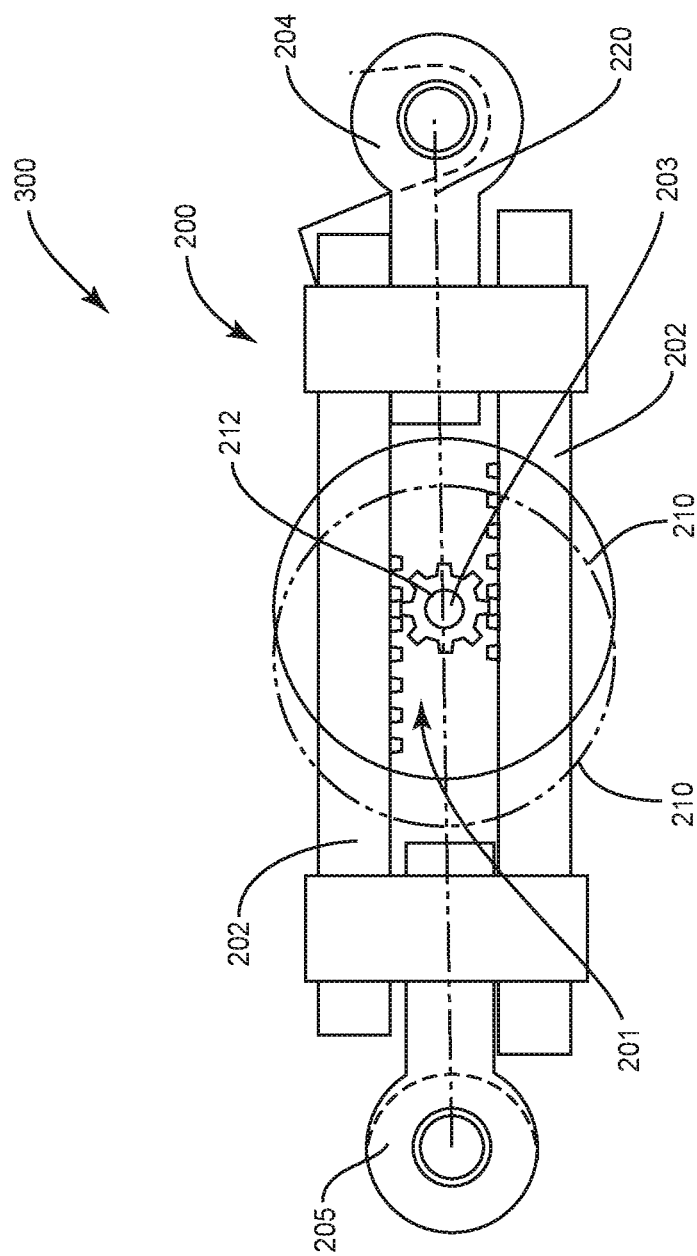
FIG. 25 is a schematic side view of an inerter that can be attached to a flight control member.

An inerter 300 can also be attached to the flight control member 11 in combination with an actuator 60 to dampen the flight control member 11. FIGS. 22 and 23 include an inerter that is integrated with the actuator 60. FIG. 25 illustrates another inerter 300 that separately attaches to the flight control member 11. The inerter 300 includes a dual rack and pinion structure with a circular pinion that engages two linear gear racks. Rotational motion applied to the pinion causes the racks to move relative to each other and relative to the pinion, thus translating the rotational motion of the pinion into linear motion.

The inerter 300 includes a flexible holding structure 200 and a dual rack and pinion assembly 201 held or clamped by and between the flexible holding structure 200. The dual rack and pinion assembly 201 includes dual racks 202 positioned opposite each other and substantially housed within and held or clamped by the flexible holding structure 200. The racks 202 include a first rack and a second rack that each has teeth. The dual rack and pinion assembly 201 also includes a pinion 203, such as in the form of a pinion gear, engaged to and between the first and second racks 202. The pinion 203 has gear teeth configured to engage the teeth of the first and second racks 202. A first terminal 204 is coupled to the first rack 202 and a second terminal 205 is coupled to the second rack 202.

The inerter 300 also includes a pair of inertia wheels 210. The inertia wheels 210 are each respectively positioned adjacent to opposite exterior sides of the flexible holding structure 200. An axle element 212 extends through the first inertia wheel 210, the flexible holding structure 200, the pinion 203, and the second inertia wheel 210. Movement of the flight control surface 11 (that is mounted to one of the terminals 204, 205) causes translational movement of the first rack 202 relative to the second rack 202, along a longitudinal inerter axis 220 which causes the rotational movement of the pinion 203 and the pair of inertia wheels 210 such that the rotational movement of the pinion 203 is resisted by the pair of inertia wheels 210 and there is no incidental motion. This results in the dual rack and pinion assembly 201 damping movement of the flight control member 11.

The motion of the pinion 203 is resisted by the inertia wheels 210 such that the change of orientation of the racks 202 are just in relation to the longitudinal inerter axis 220 by inducing a resistance force to the rotation of the first terminal 204 connected to the flight control member 11. The resistance force is resisted by the inertia wheels 210. Damping movement of the flight control member 11 provides increased flutter suppression. This can result in improved hydraulic application stability and an increased efficient flight control actuation by the actuator 60.

The actuator 60 with the integrated hydraulic actuator 130 and inerter 140 provides benefits that conventional actuator systems do not provide, or are not capable of providing. For example, the actuator 60 of the present aspects creates or contributes to a system that beneficially allows for significant savings in the power consumption of the aircraft 10 by increasing the damping of the actuator 60 that permits reduced actuator piston area and reduced flow proportional to the area reduction. Such reductions allow the hydraulic system 20 to provide hydraulic fluid at reduced flow rate. Additionally, because the actuator 60 of the present disclosure controls flutter, fewer hydraulic actuators 60 are needed on aircraft 10 thereby requiring less power to be generated by the engines 12 of the aircraft 10.

The valve 70 and methods of control the movement of hydraulic fluid can be used with a variety of aircraft 10. One aircraft includes a commercial aircraft that includes rows of seats each configured to accommodate a passenger. Other aircraft 10 include but are not limited to manned aircraft, unmanned aircraft, manned spacecraft, unmanned spacecraft, manned rotorcraft, unmanned rotorcraft, satellites, rockets, missiles, manned terrestrial aircraft, unmanned terrestrial aircraft, manned surface water borne aircraft, unmanned surface water borne aircraft, manned sub-surface water borne aircraft, unmanned sub-surface water borne aircraft, and combinations thereof.

The present invention may be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A dual spool valve to direct hydraulic fluid to a hydraulic actuator in an aircraft, the dual spool valve comprising:
   a first port to receive hydraulic fluid from a first supply line;
   a second port to discharge hydraulic fluid to a return line;
   a third port to receive hydraulic fluid from a second supply line;
   a first valve section comprising:
      a first manifold with a supply port, a return port, and an actuator port;
      a first closure line that extends between the third port and the actuator; and
      a first spool movable within the first manifold between a first position to allow hydraulic fluid to flow through the first valve section to and from the actuator through just the supply port, a second position to allow hydraulic fluid to flow through the first valve section to and from the actuator through just the return port, and a third position to allow hydraulic fluid to flow through the first valve section to and from the actuator through just the first closure line;
   a second valve section comprising:
      a second manifold with a supply port, a return port, and an actuator port;
      a second closure line that extends between the third port and the actuator; and
      a second spool movable within the second manifold between a first position to allow hydraulic fluid to flow through the second valve section to and from the actuator through just the supply port, a second position to allow hydraulic fluid to flow through the second valve section to and from the actuator through just the return port, and a third position to allow hydraulic fluid to flow through the second valve section to and from the actuator through just the second closure line.

2. The dual spool valve of claim 1, wherein the first spool comprises a shaft with first and second blocks spaced apart along the shaft, the shaft extending across the first closure line in each of the first and second positions.

3. The dual spool valve of claim 2, wherein the shaft comprises an orifice that aligns with the first closure line in the third position to allow hydraulic fluid to flow along the first closure line and through the orifice to and from the actuator.

4. The dual spool valve of claim 3, wherein the orifice includes a smaller sectional area than the first closure line to control a flow of hydraulic fluid moving along the first closure line when the first valve section is in the third position.

5. The dual spool valve of claim 1, further comprising a pair of first lines that extends between the first port and the supply ports of each of the first and second manifolds, the pair of first lines sharing a common section at the first port.

6. The dual spool valve of claim 5, further comprising a pair of second lines that extends between the second port and the return ports of each of the first and second manifolds, the pair of second lines sharing a common section at the second port.

7. The dual spool valve of claim 6, wherein the first and second closure lines are isolated from the first and second pairs of lines.

8. An assembly to position a flight control member of an aircraft, the assembly comprising:
   a hydraulic actuator operatively connected to the flight control member and comprising a piston, a first chamber on a first side of the piston, and a second chamber on a second side of the piston;
   a dual spool valve comprising:
   a first valve section comprising:
      a first manifold with a supply port, a return port, and an actuator port;
      a first closure line that extends to the first chamber of the actuator; and
      a first spool movable within the first manifold between a first position to allow hydraulic fluid to flow through the first valve section to and from the first chamber of the actuator through just the supply port, a second position to allow hydraulic fluid to flow through the first valve section to and from the first chamber of the actuator through just the return port, and a third position to allow hydraulic fluid to flow through the first valve section to and from the first chamber of the actuator through just the first closure line;
   a second valve section comprising:
      a second manifold with a supply port, a return port, and an actuator port;
      a second closure line that extends to the second chamber of the actuator; and
      a second spool movable within the second manifold between a first position to allow hydraulic fluid to flow through the second valve section to and from the second chamber of the actuator through just the supply port, a second position to allow hydraulic fluid to flow through the second valve section to and from the second chamber of the actuator through just the return port, and a third position to allow hydraulic fluid to flow through the second valve section to and from the second chamber of the actuator through just the second closure line.

9. The assembly of claim 8, wherein the dual spool valve further comprises a first port to receive hydraulic fluid, a second port to discharge hydraulic fluid, and a third port to receive hydraulic fluid.

10. The assembly of claim 9, further comprising a first supply line fluidly connected to the first port and a second supply line fluidly connected to the third port, with the second supply line supplying hydraulic fluid to the dual spool valve at a lower pressure than the first supply line.

11. The assembly of claim 9, further comprising a return line fluidly connected to the second port to receive hydraulic fluid that is removed from each of the first and second chambers of the actuator.

12. The assembly of claim 8, wherein the first and second spools include a common shape and size.

13. The assembly of claim 8, wherein the first spool comprises a shaft with first and second blocks spaced apart along the shaft, the first block positioned at the supply port in the first position, the second block positioned at the return port in the second position, and the shaft extending across the first closure line in each of the first and second positions.

14. The assembly of claim 13, wherein the shaft of the first spool comprises an orifice that is aligned with the first closure line in the third position to allow hydraulic fluid to flow along the first closure line through the orifice to and from the first chamber of the actuator.

15. The assembly of claim 14, wherein the orifice includes a smaller sectional area than the first closure line to control a flow of hydraulic fluid moving along the first closure line when the first valve section is in the third position.

16. The assembly of claim 13, wherein the shaft of the second valve section comprises an orifice that is aligned with the second closure line in the third position to allow hydraulic fluid to flow along the second closure line through the orifice and to and from the second chamber of the actuator.

17. The assembly of claim 9, further comprising a pair of first lines that extends between the first port and the supply ports of each of the first and second manifolds, the pair of first lines sharing a common section at the first port.

18. The assembly of claim 17, further comprising a pair of second lines that extends between the second port and the return ports of each of the first and second manifolds, the pair of second lines sharing a common section at the second port.

19. The assembly of claim 18, wherein the first and second closure lines are isolated from the first and second pairs of lines.

20. A method of controlling an actuator connected to a flight control member of an aircraft, the method comprising:
operating a dual spool valve in a first setting by selectively positioning a first spool and controlling hydraulic fluid moving through first and second ports into and out of a first chamber of the actuator and selectively positioning a second spool and controlling hydraulic fluid moving through the first and second ports into and out of a second chamber of the actuator; and
operating the dual spool valve in a second setting by positioning the second spool to a fixed position and preventing hydraulic fluid from moving into or out of the second chamber through either the first or second ports and allowing hydraulic fluid into and out of the second chamber through a third port and selectively positioning the first spool and controlling hydraulic fluid moving through the first and second ports into and out of the first chamber.

21. The method of claim 20, further comprising selectively positioning the first spool in a first manifold and selectively positioning the second spool in a second manifold.

22. The method of claim 20, further comprising in the first setting blocking a second line extending from the third port with the first spool and preventing hydraulic fluid from moving into or out of the first chamber through the third port and blocking a first line extending from the third port with the second spool and preventing hydraulic fluid from moving into or out of the second chamber through the third port.

23. The method of claim 22, further comprising in the second setting aligning an orifice in the second spool with the first line and allowing hydraulic fluid from the third port to move through the orifice and into the second chamber.

24. The method of claim 23, further comprising in the second setting aligning an orifice in the first spool away from the second line and preventing hydraulic fluid from moving along the second line to the first chamber.

25. The method of claim 20, further comprising the hydraulic fluid at the first port is at a higher pressure than the hydraulic fluid at the third port.

26. The method of claim 20, further comprising determining a failure in the dual spool valve and moving the dual spool valve from the first setting to the second setting.

27. The method of claim 26, further comprising determining that one of the first and second spools did not move to a commanded position and changing the dual spool valve from the first setting to the second setting.

28. The method of claim 27, further comprising de-energizing a solenoid operatively connected to the second spool and positioning the second spool in a fixed position in the second setting.

29. The method of claim 20, further comprising operating a first solenoid and selectively positioning the first spool and simultaneously operating a second solenoid and selectively positioning the second spool.

30. A method of controlling an actuator connected to a flight control member of an aircraft, the method comprising:
operating a dual spool valve in a first setting by selectively positioning a first spool between first and second positions to block and open a supply port and a return port in the first manifold and controlling hydraulic fluid into and out of a first chamber of the actuator and simultaneously selectively positioning a second spool between first and second positions to block and open a supply port and a return port in the second manifold and controlling hydraulic fluid into and out of a second chamber of the actuator;
determining that the second spool has failed and moving the second spool to a failed position and blocking the supply port and the return port in the second manifold and opening a second supply port and moving hydraulic fluid into and out of the second chamber; and
while the second spool is in the failed position, selectively positioning the first spool between the first and second positions to block and open the supply port and the return port in the first manifold and controlling hydraulic fluid into and out of the first chamber of the actuator.

31. The method of claim 30, further comprising aligning an orifice in the second spool with a supply line extending from the second supply port and moving hydraulic fluid to move into and out of the second chamber.

32. The method of claim 31, further comprising in the first setting positioning the orifice in the second spool away from the supply line extending from the second supply port and blocking hydraulic fluid in the supply line.

* * * * *